United States Patent [19]

Whipple

[11] 4,229,801
[45] Oct. 21, 1980

[54] FLOATING POINT PROCESSOR HAVING CONCURRENT EXPONENT/MANTISSA OPERATION

[75] Inventor: David L. Whipple, Braintree, Mass.

[73] Assignee: Data General Corporation, Westboro, Mass.

[21] Appl. No.: 968,227

[22] Filed: Dec. 11, 1978

[51] Int. Cl.³ .............................................. G06F 7/48
[52] U.S. Cl. .................................................... 364/748
[58] Field of Search ........................................ 364/748

[56] References Cited
U.S. PATENT DOCUMENTS

| | | | |
|---|---|---|---|
| 3,551,665 | 12/1970 | Powers et al. | 364/748 |
| 3,697,734 | 10/1972 | Booth et al. | 364/748 |
| 3,871,578 | 3/1975 | Van De Goor et al. | 364/748 |
| 4,075,704 | 2/1978 | O'Leary | 364/748 |
| 4,130,879 | 12/1978 | Cushing et al. | 364/748 |

*Primary Examiner*—David H. Malzahn
*Attorney, Agent, or Firm*—Joel Wall; Gary Clapp

[57] ABSTRACT

A Floating Point Processor or Floating Point Unit (FPU) with capability for performing exponent/sign-related calculations concurrently with mantissa-related calculations. The operation of the FPU within the context of a general purpose digital computer system is shown. The FPU has control, mantissa, and exponent-/sign functional blocks which have unique architectural arrangements and interconnections therebetween, and also have interfacing structure for connecting system control and clock signals to the control block. The operation of the FPU is timed in a particular manner to permit its operation to be transparent to, or to not impact operation of the CPU, when the FPU communicates with main memory or the CPU.

20 Claims, 19 Drawing Figures

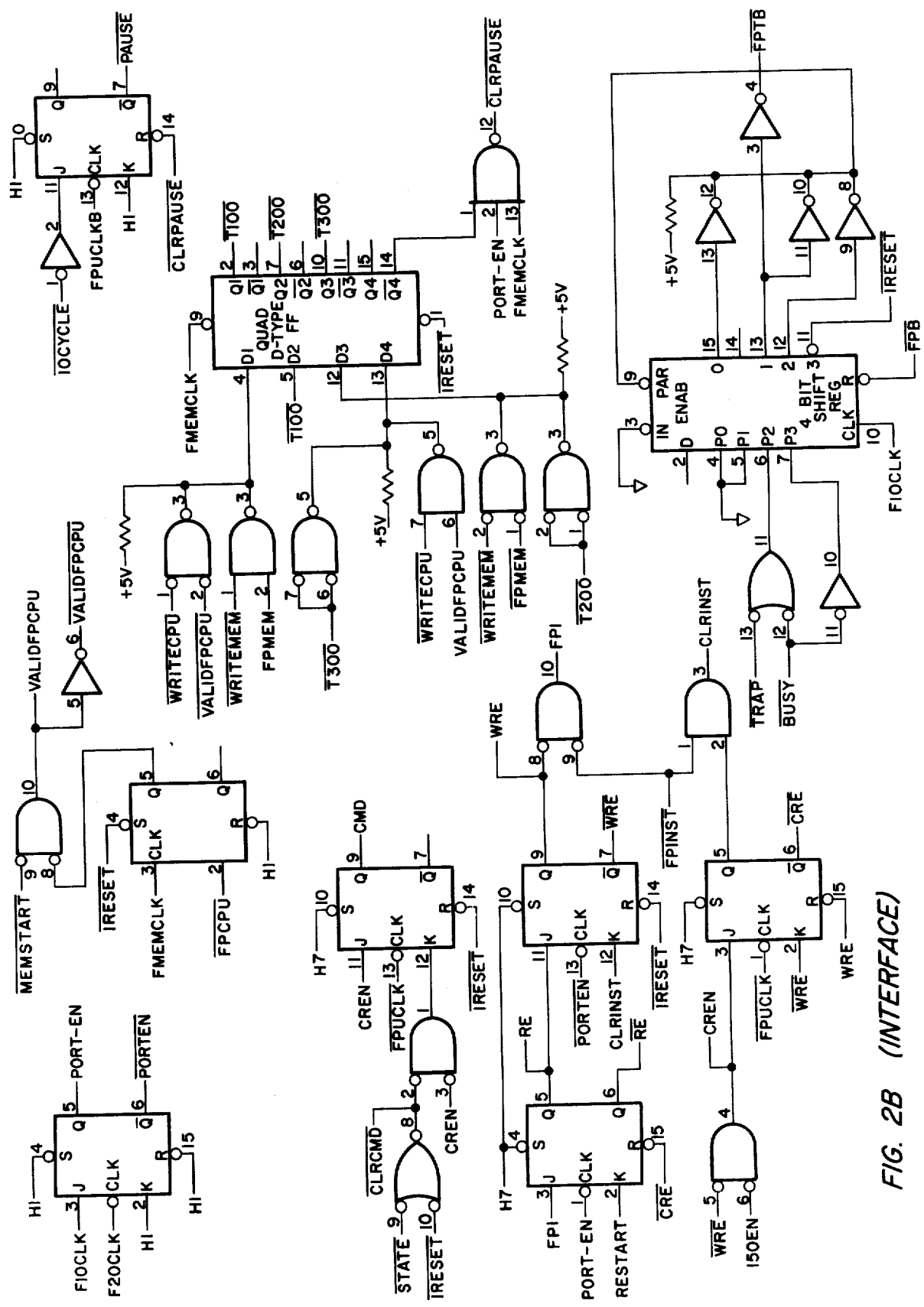
FIG. 2B (INTERFACE)

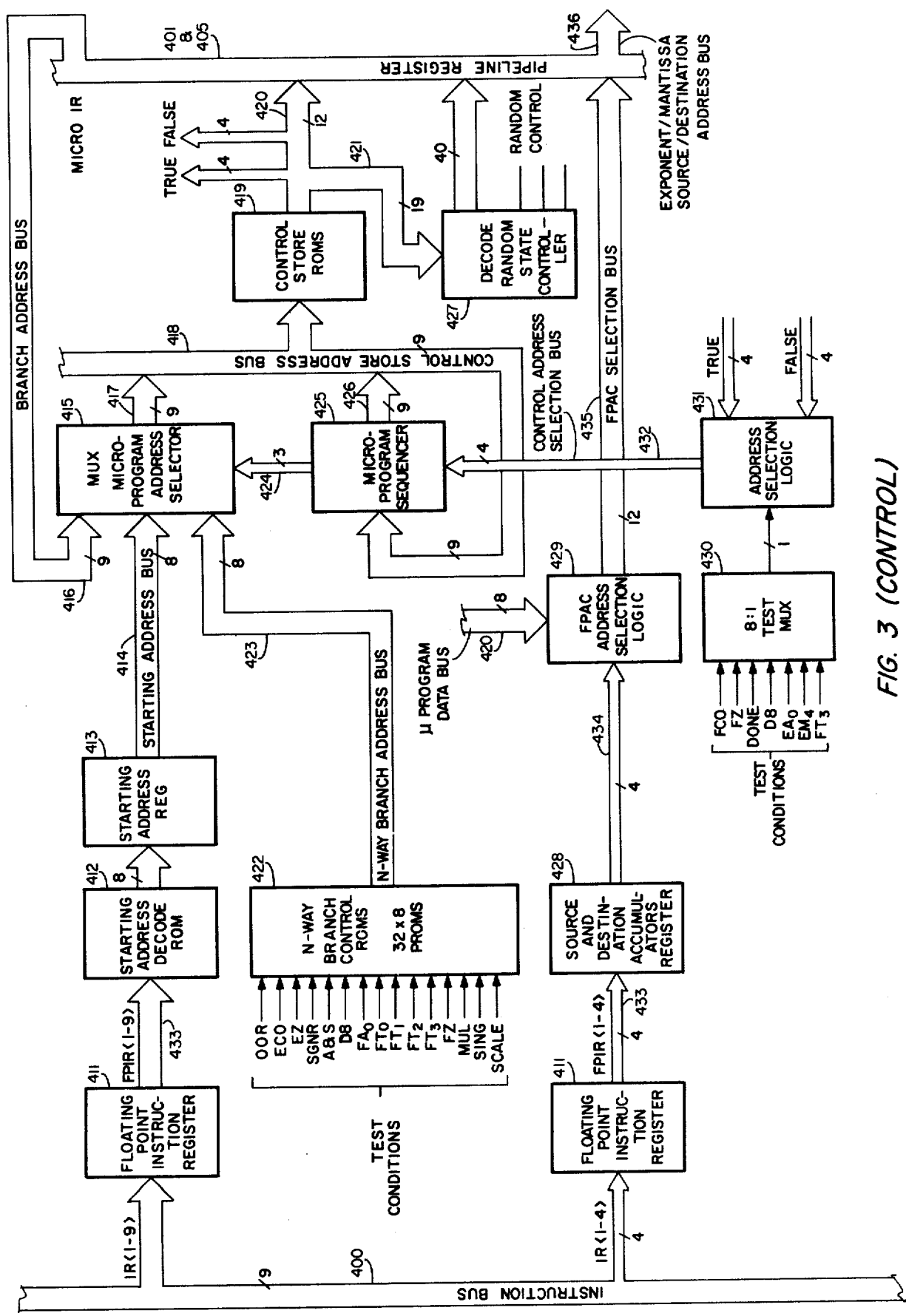
FIG. 3 (CONTROL)

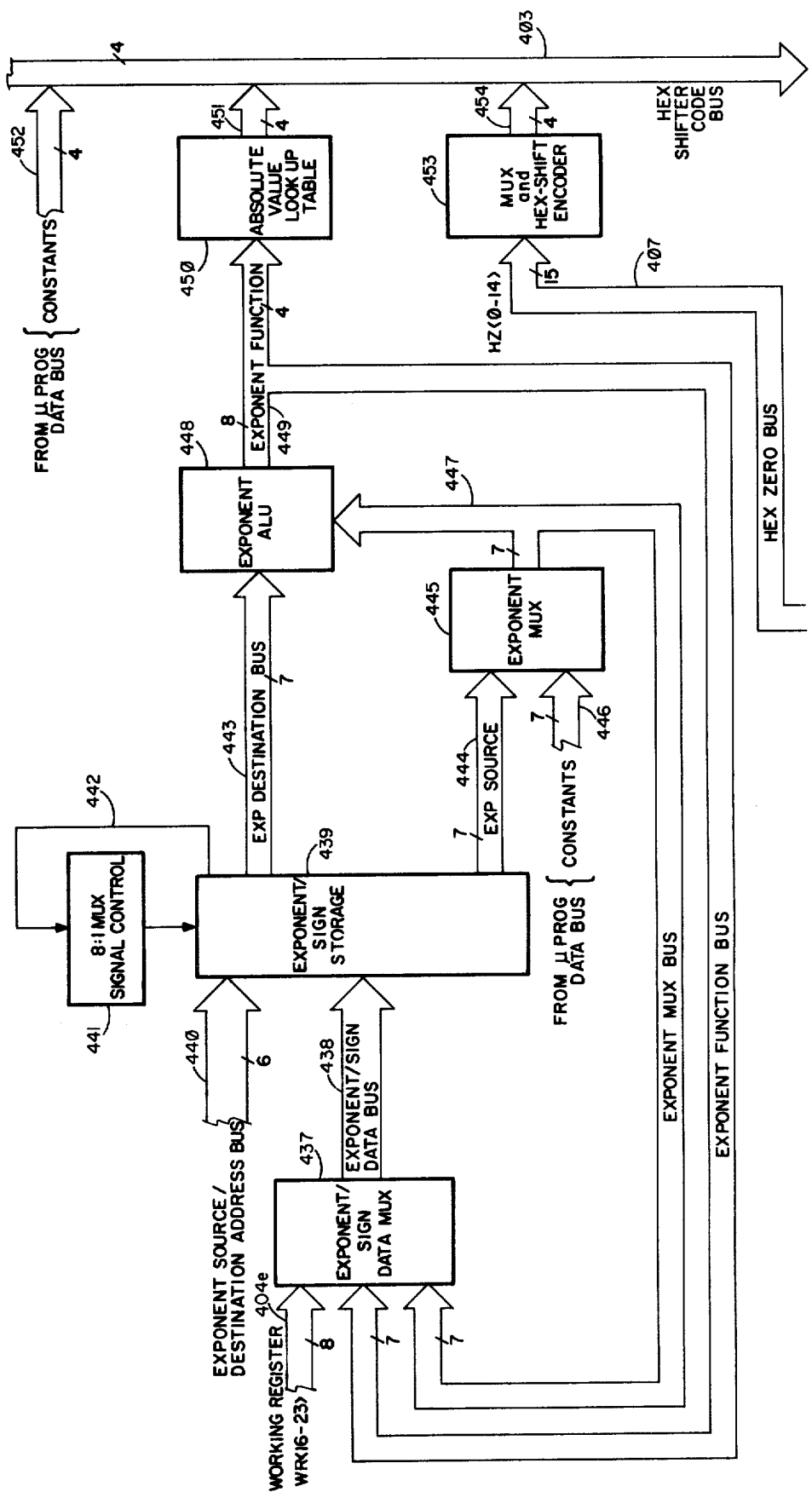
FIG. 4 (EXPONENT/SIGN)

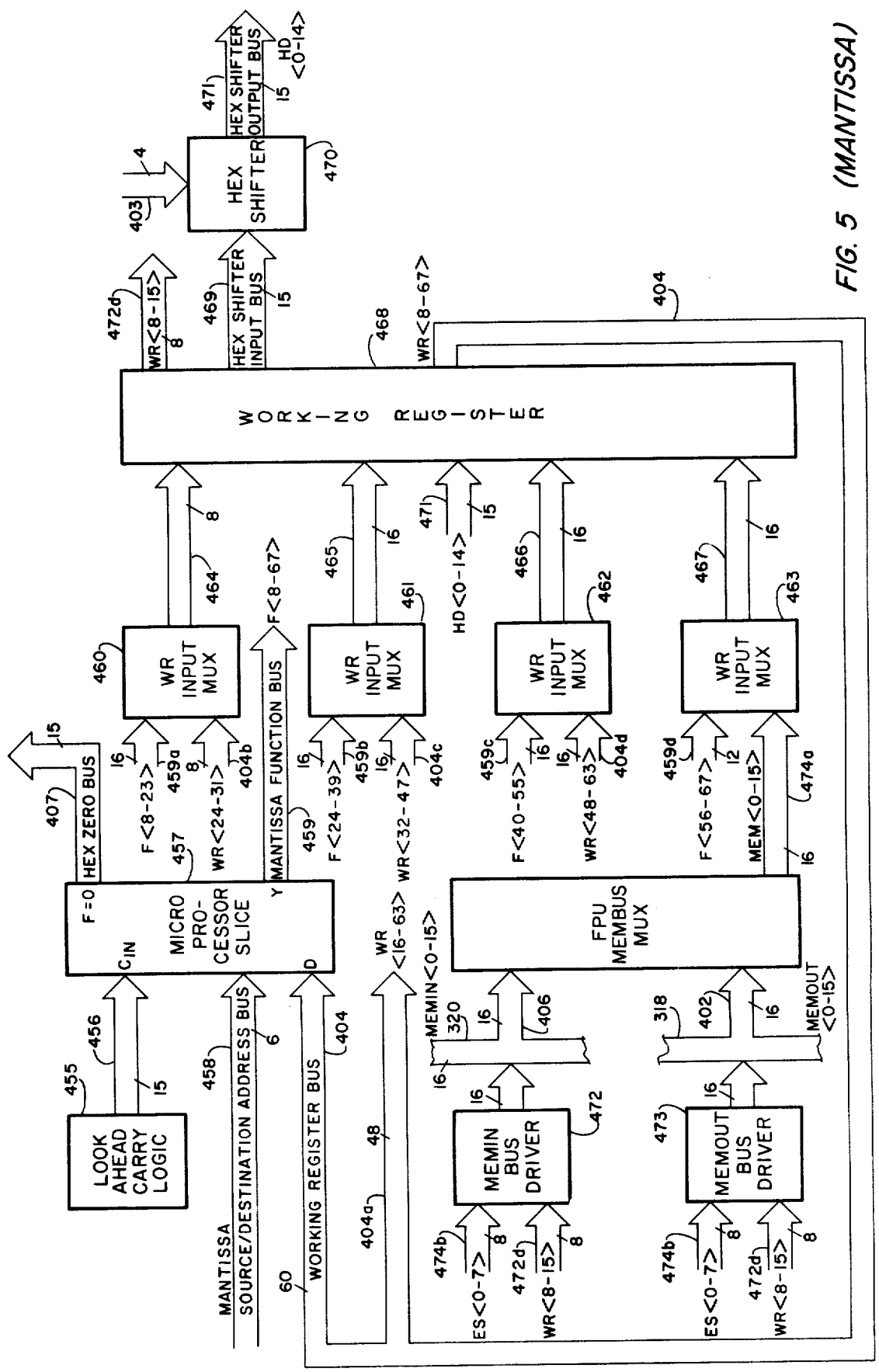
FIG. 5 (MANTISSA)

CONTROL STORE ROMS BUS OUTPUT FORMAT

| BITS | FUNCTION |
|---|---|
| 1 | MANTISSA CARRY IN |
| 3 | MANTISSA ALU FUNCTION |
| 3 | MANTISSA ALU SOURCE |
| 3 | MANTISSA ALU DESTINATION |
| 3 | MANTISSA ADDRESS SOURCE |
| 3 | EXPONENT ADDRESS SOURCE |
| 12 | FPAC REGISTER SELECT |
| 3 | EXPONENT ALU FUNCTION |
| 2 | SIGN CONTROL FIELD |
| 4 | EXPONENT REGISTER CONTROL FIELD |
| 2 | CLOCK SELECT FIELD |
| 1 | STATE FIELD |
| 4 | TRUE MICROADDRESS SELECT |
| 4 | FALSE MICROADDRESS SELECT |
| 2 | WORKING REGISTER CONTROL |
| 3 | TEST CONDITION SELECT |
| 9 | LITERAL FIELD |
| 6 | RANDOM FIELD |
| 4 | STATE CONTROL FIELD |

WORKING REGISTER STACK CONFIGURATION

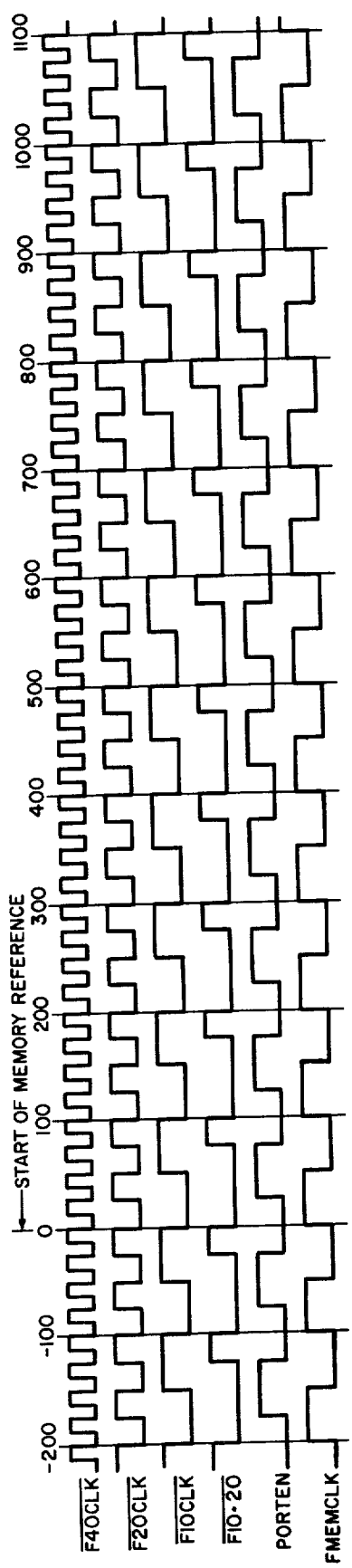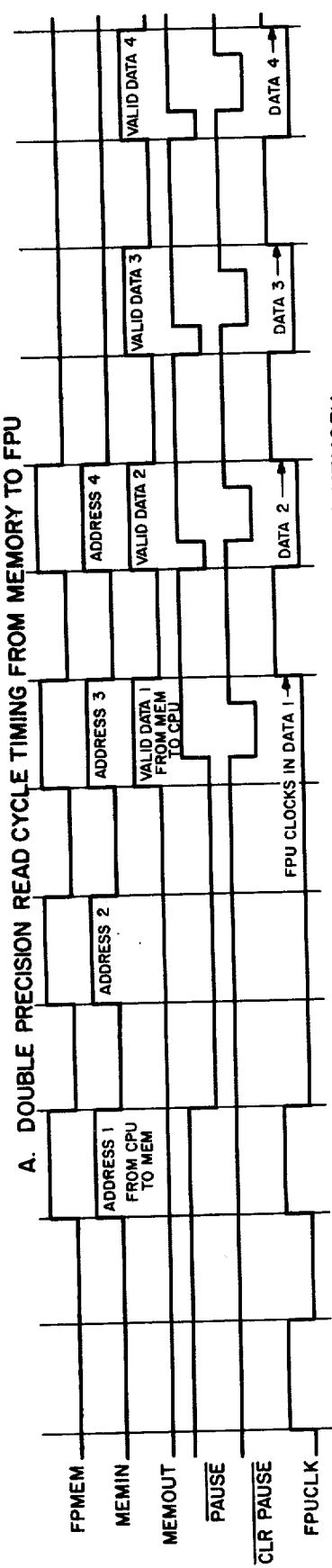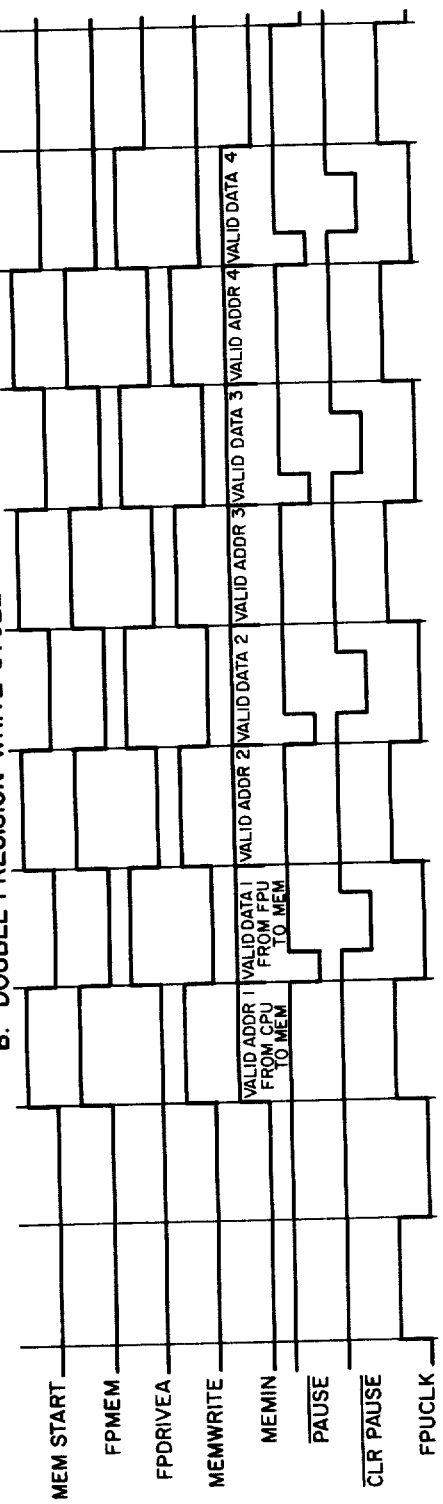
FIG. 14A

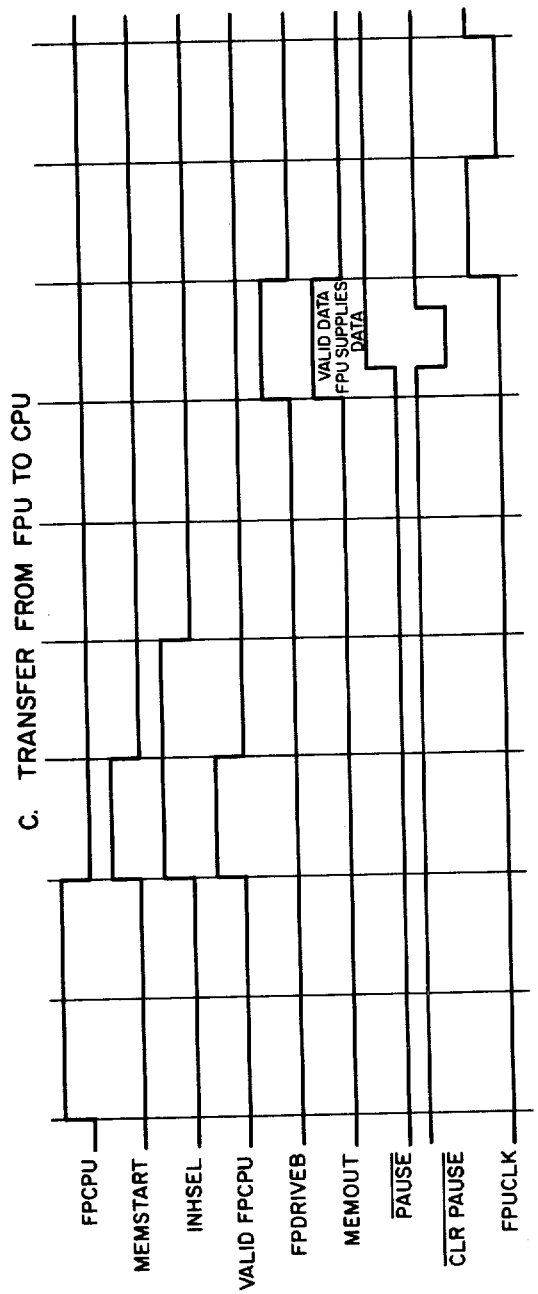
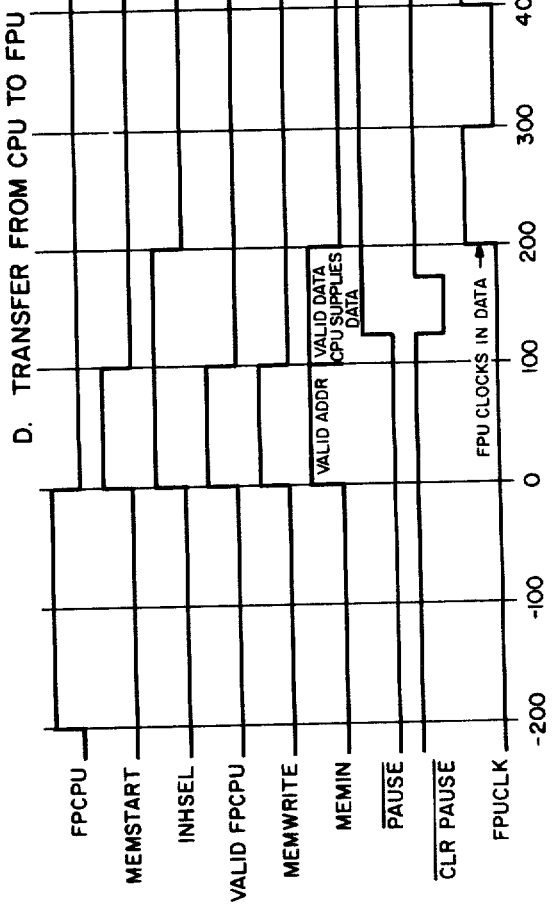
FIG. 14B

FLOATING POINT PROCESSOR HAVING CONCURRENT EXPONENT/MANTISSA OPERATION

CROSS-REFERENCE TO RELATED APPLICATIONS

The present application relates to an earlier-filed U.S. patent application Ser. No. 959,038, filed on Nov. 8, 1978 entitled "High-Speed Digital Computer System", inventor, David Grondalski. This related application and the instant application are both assigned to Data General Corporation, and is incorporated herein by reference.

BACKGROUND OF THE INVENTION

1. Field of the Invention

The present invention relates in general to data processing systems, and more particularly relates to a floating point unit for making floating point calculations within the data processing system.

2. Description of Prior Art

The representation of numbers in data processing systems, particularly non-integer numbers, requires the introduction of a decimal point into the notation. As one option, data processing systems may employ "fixed point notation" wherein the decimal point is placed immediately to the right of the least significant digit or placed immediately to the right of the signed bit before the first information bit.

A further option is called "floating point notation" in which the number is represented by a sign, an exponent, and a mantissa. Such technique is described in many texts, one example being "Computer Architecture", Caxton C. Foster, Van Nostrand Rheinhold Company, New York, New York, 1976, pp. 16 et seq.

Floating point processing units tend to become relatively complex when designed for use for large decimal ranges and increased precision capabilities. One technique which provides for a relatively good degree of flexibility and good accuracy, using some simplification of conventionally used floating point architecture, is described in Canadian Pat. No. 1,105,065, issued Aug. 2, 1977, to Richard T. McAndrew, and assigned to the assignee of the instant application. Such architecture is designed for shifting first and second operands, such operands having first and second mantissa and exponent values, respectively, for performing arithmetic operations. Arithmetic logic means and register means are provided therein for generating a pre-selected scale factor, to denote operand shifting requirements. Scaler means therein are connected for selectively loading the registers in serial fashion in a first direction and for scaling and operand input in response to the pre-selected scale factor. Switch means are utilized for selectively connecting the register to the scaler means for serially writing out of the selected register in the first direction.

Another technique of the prior art which provides an improvement in speed of operation of mantissa multiplication techniques is provided by performing the operation on four bits of the multiplier mantissa simultaneously as opposed to using single bit mantissa multiplication techniques; this technique is demonstrated in U.S. patent application Ser. No. 871,616, filed Jan. 23, 1978, entitled "Floating Point Data Processing System", inventor, Edward Rasala, and assigned to the assignee of the present application. In this prior art application, the four-bit mantissa multiplication is performed in hexadecimal notation, using appropriately interconnected shifter units, arithmetic logic units, and registers. In accordance with this prior art patent application, the overall operation is effectively a "pipeline" operation wherein a working register always contains a partial product and a final register always contains a partial sum which is fed back into a second arithmetic logic unit to provide a continuous computation. The total product at a final register is supplied to the data processing system by way of an internal mantissa bus to the data bus which provides for data transfer between the processing system and the floating point unit.

While the systems described in the above-referenced prior art patent and patent application have capability for performing rapid and convenient arithmetic operations on a large range of numbers with reasonably high precision and speed, the overall operation of the floating point processor which employs architecture to provide a mantissa calculation function, and exponent/sign calculation function, and a control of both of these other functions, can yet be improved. The present invention provides this improvement in operating speed and efficiency by incorporating techniques which permit simultaneous operation of both the mantissa and exponent functions under a unique control architecture.

Accordingly, the continual challenge or problem of reducing the time for specific calculations and for overall operation of a floating point processor is met by the design or solution of the present invention to be described in detail hereinbelow.

SUMMARY OF THE INVENTION

The present invention relates to a floating point unit (FPU) for making floating point calculations within a data processing system. The floating point unit comprises mantissa architecture, exponent/sign architecture, and control architecture for controlling operations of the mantissa architecture and the exponent/sign architecture. The mantissa architecture manipulates the mantissa portions of certain of the data in a first predetermined manner, and the exponent/sign architecture manipulates other data received from the mantissa architecture in a second predetermined manner. The control architecture permits concurrent operation of the exponent/sign architecture and the mantissa architecture.

In a further feature of the present invention, the control architecture comprises a microprogram control structure for generating sets of microprogram control signals and pipeline register structure for assisting in the rapid transfer of the microprogrammed control signals to a control position for controlling operation of the FPU.

It is thus advantageous to employ the present invention within a data processing system to enable such system to achieve higher speeds and efficiencies relative to the manipulation of data.

It is thus an object of the present invention to provide an improved data processing system.

It is a further object of the present invention to provide an improved floating point unit for use within a data processing system.

It is a still further object of the present invention to provide an improved floating point processor wherein the manipulation and control of the mantissa function and the exponent/sign function are performed in a concurrent or simultaneous fashion to achieve a higher degree of overall efficiency of operation.

Other objects and advantages of the present invention will be understood by those of ordinary skill in the art, after referring to the detailed description of the preferred embodiments and the appended drawings wherein:

BRIEF DESCRIPTION OF THE DRAWINGS

FIG. 2B is a schematic diagram of the interface circuitry of FIG. 2A;

FIG. 3 shows a more detailed block diagram of the control architecture depicted in FIG. 2A;

FIG. 4 is a more detailed block diagram of the exponent/sign architecture shown in FIG. 2A;

FIG. 5 is a more detailed block diagram of the mantissa architecture shown in FIG. 2A;

FIG. 6 is a schematic representation of the bus output format of control store ROM 419;

DETAILED DESCRIPTION OF THE PREFERRED EMBODIMENTS

Figure 1A:
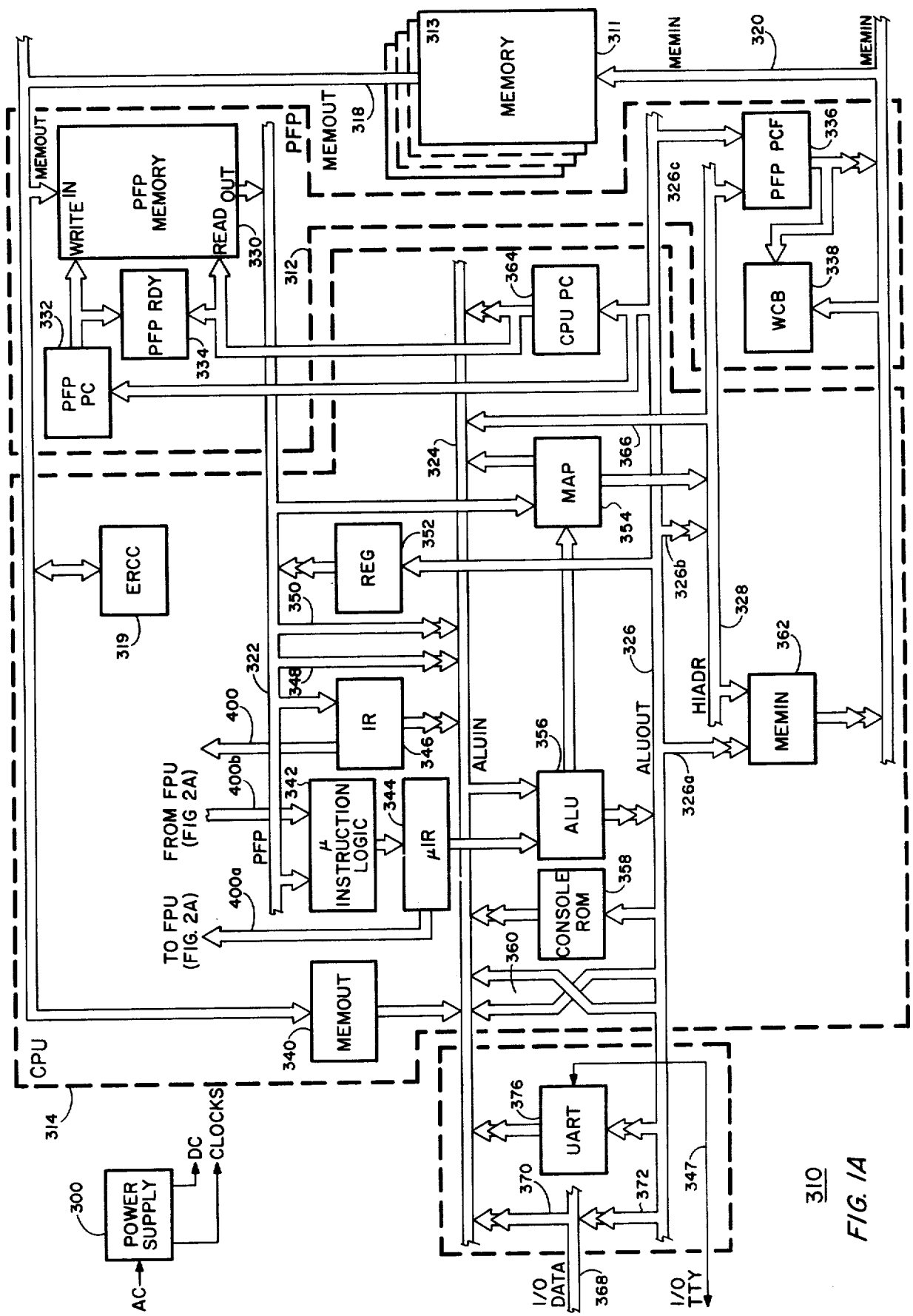
FIG. 1A is block diagram of the data processing system with which the floating point processor operates.

A detailed description in brief of the overall data processing system in which the present invention is employed will first be presented. With regard to FIG. 1A, memory 311, of computer 310 comprises one or more sub-memories 313. Memory 311 output is connected by MEMOUT bus 318 to inputs of MEMOUT register 340 in CPU 314 and memory 330 in PFP 312 and to FPU 490 in FIG. 2A (described below). MEMOUT bus 318 is also connected to error correction (ERCC) logic 319 in CPU 314. MEMOUT register 340 output is connected to ALUIN bus 324 and PFP memory 330 output is connected to PFP bus 322. PFP bus 322 is connected to ALUIN bus 324 through Transfer bus 348, Short Effective Address (EFA) bus 350, and IR 346. PFP bus 322 is connected to inputs of microinstruction logic 342 and memory allocation and protection circuitry (MAP) 354. ALUIN bus 324 is connected to another input of ALU 356. A first output of ALU 356 is connected to ALUOUT bus 326 and a second output is connected to an input of MAP 354. ALUOUT bus 326 is connected to ALUIN bus 324 through SWAP bus 360 and Console ROM 358, and to PFP bus 322 through register 352. ALUOUT bus 326 is connected to inputs of CPU program counter (CPUPC) register 364 and PFP Fetched Program Count (PCF) register 332. CPU PC register 364 output is connected to ALUIN bus 324, to an input of PFP Ready (PFPRDY) logic 334, and to read address input of PFP memory 330. PFP PCF register 332 output is connected to another input of PFPRDY logic 334, and to write address input of PFP memory 330. ALUOUT bus 326 is connected to an input of MEMIN register 362 by bus 326a, to high order address (HIADR) bus 328 by bus 326b, and to an input of PFP requested program count (PCR) register 336. MAP 354 outputs are connected to ALUIN bus 324 and to HIADR bus 328. HIADR bus 328 is connected to ALUIN bus 324 by Transfer bus 366. HIADR bus 328 is connected to inputs of MEMIN register 362 and PFP PCR register 336. MEMIN register 362 and PFP PCR register 336 outputs are connected to MEMIN bus 320, which is connected to memory 311 input and to FPU 490 in FIG. 2A (described below). PFP PCR register 336 output is connected to an input of write current block logic (WCB) 338, and MEMIN bus 320 is connected to another input of WCB 338.

Data I/O bus 368 is connected to ALUIN bus 324 through bus 370, and to ALUOUT bus 326 through bus 372.

CPU 314 has direct access to memory 311 for writing or reading instructions and data into or from memory 311. FPU 490 of FIG. 2A also has direct access to memory 311 under certain conditions described below. CPU 314 also has indirect access to memory 311, through PFP 312 which fetches and stores instructions ahead of the instruction currently being executed by CPU 314.

Turning first to direct access between CPU 314 and memory 311, memory 311 output is provided directly to ALUIN bus 324 and ALU 356 through MEMOUT register 340. Similarly, ALU 356 has direct access to memory 310 input, to directly enter or request data or instructions, through ALUOUT bus 326 and MEMIN register 362. Data words are provided to MEMIN register 362 directly from ALU output bus 326, but provision of addresses to memory 310 depends upon whether the user is utilizing direct addressing of memory 311, or MAPped addressing. In direct addressing, logical address bits 6 through 15 are provided to MEMIN register 362 through bus 326a; logical address bits 0 through 5, and bits 16 through 19, are provided through bus 326b and HIADR bus 328. When MAPping is utilized, logical address bits 6 through 15 are provided to MEMIN register 362 from ALUOUT bus 326 and bus 326a. Logical address bits 1 through 5 are provided to MAP 354 from ALU 356. MAP 354 translates logical address bits 1 through 5 into corresponding bits 0 through 5 and 16 through 19 of physical address, and provides these bits to MEMIN register 362 through HIADR bus 328.

Considering indirect access between CPU 314 and memory 311, PFP 312 performs instruction lookahead for CPU 314 by fetching from memory 310, and storing, a sequence of instructions in advance of the instruction currently being executed by CPU 314. CPU 314 maintains track of program being executed by storing a part of the logical address of the instruction currently being executed in CPU PC register 364; this number is referred to as CPU program count (CPUPC). The initial CPUPC of a sequence of instructions is loaded into CPUPC register 364 from ALU 356 through ALUOUT bus 326. CPUPC is then incremented each time an instruction is executed, by one if instructions are to be called out of memory 311 in sequence. If the current instruction calls for a jump, or similar operation, a new CPUPC is loaded into CPUPC register 364. Physical address of the initial instruction of the sequence of instructions is loaded into PFP PCR register 336 as PFPPCR. As when addresses are loaded into MEMIN register 362, physical address may be direct or MAPped. If direct, physical address is provided from ALU 356 through bus 326c. If MAP 354 is operating, bits 6 through 15 will be loaded through bus 326c and MAPped bits 1 through 5 and 6 through 19 will be loaded through HIADR bus 328 from MAP 354. At the same time, least significant bits 12 through 15 of physical address are loaded into PFP PCF 332 as PFPPCF. CPUPC therefore represents the initial logical address of the sequence, while PFPPCR and PFPPCF represent the initial physical address.

Thereafter, at each available memory access cycle not required for other purposes, e.g., by CPU 314 or I/O devices 316, physical address PFPPCR in PFP PCR register 336 can be placed on MEMIN bus 320 to read out the corresponding stored instruction from memory 311. A word requested by PFPPCR and appearing on MEMOUT bus 318 is stored in PFP memory 330 at an address determined by PFPPCF. PFPPCR and PFPPCF are incremented whenever a word is read from memory 311. PFP PCR register 336 thereby generates and tracks requested addresses; PFP PCR register 332 tracks fetched addresses and selects storage addresses in PFP memory 330. WCB 338 compares addresses requested by PFPPCR to addresses written into by CPU 314 and provides a warning if CPU 314 writes into the instruction addresses requested by PFP 312.

Transfer of words from PFP memory 330 to CPU 314 is controlled by CPU PC register 364 and PFPRDY logic 334. CPUPC stored in CPU PC register 64 is provided as read address to PFP memory 330. Instructions in PFP memory 330 are thereby transferred onto PFP bus 322 and are available to microinstruction logic 342 and IR 346 for use as required by the program. PFPRDY 334 compares PFPPCF write addresses to CPUPC read addresses and indicates to CPU 314 whether PFP 312 has the next instruction required by CPU 314.

Turning to other features of CPU 314, ERCC logic 319 monitors all data or instruction words written into or read from memory 311. ERCC 319 generates error correcting bits of words written into memory 311 through MEMIN bus 320. If a readout word containing an error appears on MEMOUT bus 318, ERCC logic 319 inhibits memory 311 output and generates a corrected word. ERCC logic 319 drives the corrected word onto MEMOUT bus 318 in place of the erroneous word. Transfer bus 348 allows words on PFP bus 322 to be transferred directly to ALU 356 through ALUIN bus 24. Short Effective Address bus 350 allows the eight least significant bits of the word on PFP bus 322 to be transferred to ALUIN bus 324 as a short effective address, i.e., to generate a memory address relative to a currently known memory address. Register 352 allows ALU 356 output on ALUOUT bus 326 to be transferred onto PFP bus 322, e.g., as an input to microinstruction logic 342, IR 346, or MAP 354. SWAP bus 360 allows bytes on ALUOUT bus 326 to be reversed and placed on ALUIN bus 324 as an input to ALU 356. Transfer bus 366 allows an address on HIADR bus 328 to be transferred onto ALUIN bus 324.

Referring to I/O devices 316 and Console ROM 358, I/O data channel 368 and I/O busses 370 and 372 permit data to be transferred between ALUIN bus 324 or ALUOUT bus 326 and an external device. Similarly, UART 376 permits transfer of data and instructions between ALUIN bus 324 or ALUOUT bus 326 and an external device connected to I/O ASCII bus 374. Console ROM 358 is an interface device allowing an external device having, e.g., an ASCII interface, to operate as a computer console. External ASC II characters are received by UART 376, converted to binary code, and placed on ALUIN bus 324. They are processed using ALU 356 and appear on ALUOUT bus 326 as Console ROM 358 addresses. Addresses on ALUOUT bus 326 are then translated into machine language instructions by Console ROM 358.

A detailed description in brief of memory 313 in which instructions controlling FPU 490 are stored is next presented.

Figure 1B:
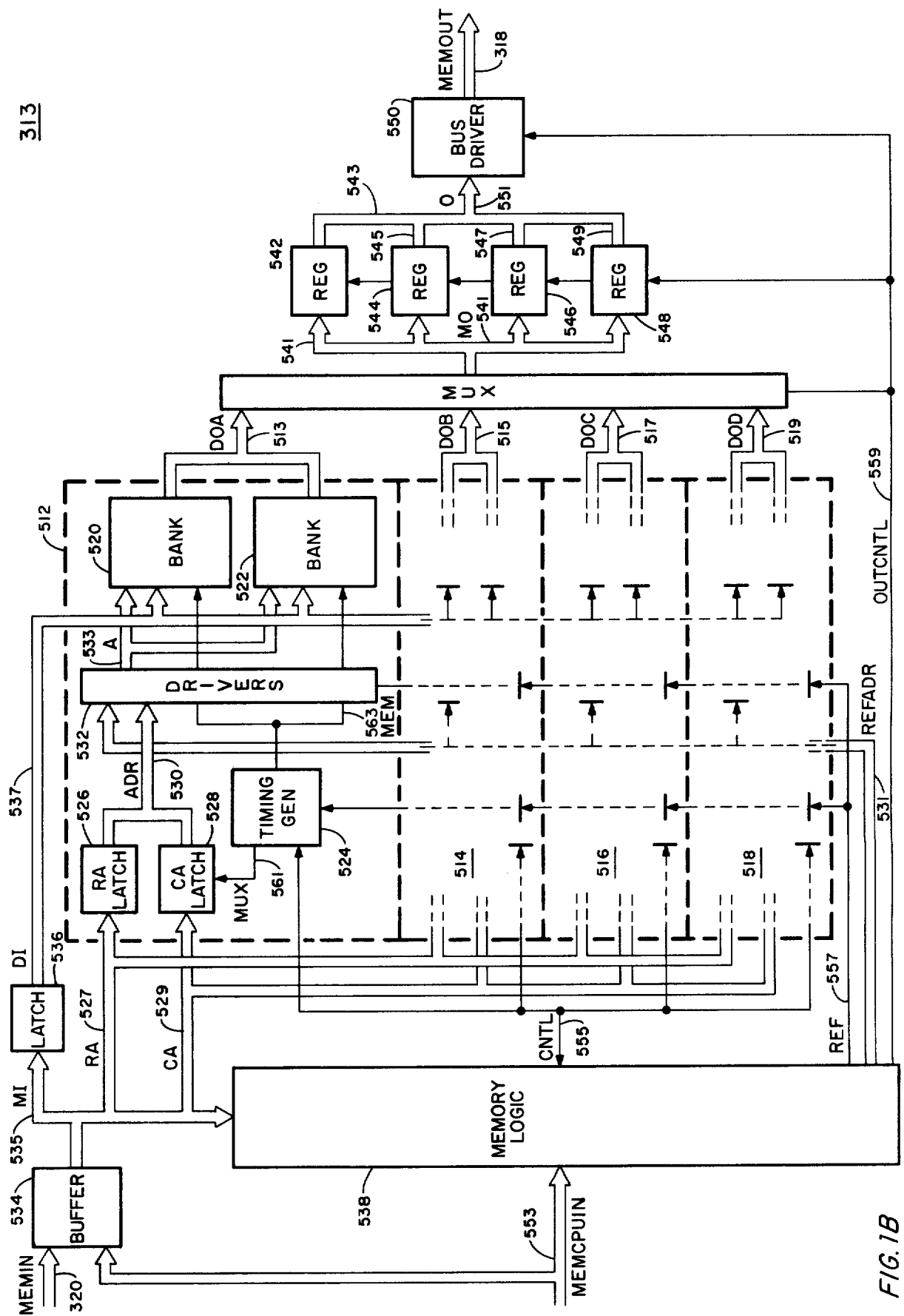
FIG. 1B is a diagram of the memory of FIG. 1A, and with which the FPU communicates.

Referring to FIG. 1B, a block diagram of a sub-memory 313 is shown. Sub-memory 313 is organized as four identical memory modules, 512, 514, 516, and 518. Modules 514, 516, and 518 are shown in skeleton form, without the detail shown in module 512, to enhance clarity of presentation. Thus, structure and operation of modules 512 to 518 will be discussed with reference to module 512. Data and address busses are indicated by parallel lines and control busses by single, heavy lines.

Each module comprises two identical random access memory (RAM) banks, 520 and 522, timing generator 524, row address latch 526, column address latch 528, and memory driver circuits 532. Each RAM bank 520 or 522 may comprise 21 memory elements. Each element may be 16K long (16,384 words) by 1 bit wide random access memory (RAM) internally arranged as 128 rows by 128 columns. The 21 memory elements are, therefore, capable of storing 16K 21-bit words. MEMIN bus 320 is connected from the CPU, PFP, and FPU to inputs of buffer circuitry 534, which provides corresponding outputs on Memory Input (MI) bus 535. 21 lines of MI bus 535 are connected to inputs of data latch 536, and Data Input (DI) bus 537 is connected directly to data inputs of banks 520 and 522 of modules 512 to 518.

Board, Module, and Bank Select (BMS) bus 539 is connected between MI bus 535 and memory logic 538 inputs. Row Address (RA) bus 527 and Column Address (CA) bus 529 are connected, respectively, from MI bus 535 to inputs of row address latches 526 and column address latches 528 of modules 512 to 518. Latches 526 and 528 outputs are connected as Address (ADR) bus 530 to inputs of driver circuits 532. Refresh Address (REFADR) bus 531 from memory logic 538 connects to other inputs of driver circuits 532 of modules 512 to 518. Array Address (A) busses 533 are connected from driver circuits 532 to address inputs of banks 520 and 522.

Data outputs of banks 520 and 522 of each memory module are wire ORed to comprise data output (DO) busses DOA bus 513 to DOD bus 519 of, respectively, modules 512 to 518. DOA bus 513 to DOD bus 519 are connected to inputs of output multiplexor (MUX) 540. Multiplexor output (MO) bus 541 is connected to inputs of output registers 542 to 548. Register Output (RO) busses 543 to 549 are wire ORed to comprise Output (O) bus 551 to bus driver circuit 550 input. Bus driver 550 output is connected to MEMOUT bus 318. Control line MOENB (not shown for clarity of presentation) is connected from bus driver 550 output to an input of, e.g., CPU 314.

Control and clock (CC) bus 321 is connected between memory logic 538, buffer 534, CPU 314, and PFP 312. Memory logic 538 and timing generators 534 of modules 512 to 518 are interconnected by memory control (CTL) bus 555. Refresh Control (REF) bus 557 from logic 538 is connected to inputs of timing generators 524 and driver circuits 532 of modules 512 through 518.

Output Control (OUTCNTL) bus 559 from memory logic 538 is connected to inputs of output multiplexor 540, output register 542 to 548, and bus driver 550. Although not shown, for clarity of presentation, control line DATAINLATCH from logic 538 is connected to an input of data latch 536 and control line MEMWRITE is connected from buffer 534 to inputs of latches 526 and 528. Control line MEMSTART from buffer 534 is connected to a logic 538 input.

Address Multiplexor (MUX) busses 561 are connected to inputs of latches 526 and 528 of modules 512 to 518. Module Control (MEM) busses 563 are connected through driver circuits 532 to inputs of banks 520 and 522 of modules 512 to 518.

Figure 2A:
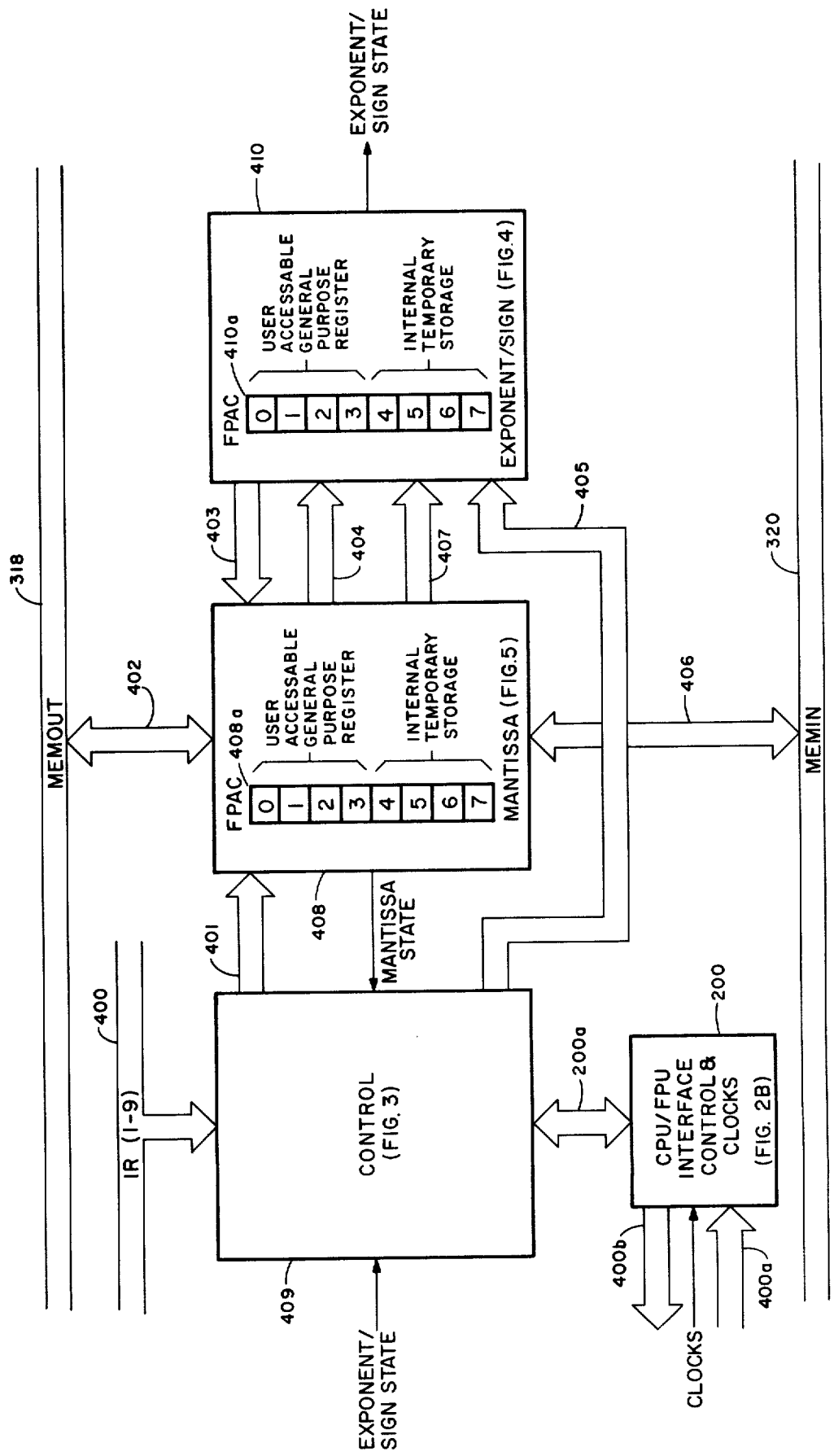
FIG. 2A is a block diagram of the FPU, showing its interconnections with structure of FIG. 1.

The foregoing description of the main memory of this data processing system may be useful background for understanding the functioning of FPU 490 of FIG. 2A, since FPU 490 is connected to the rest of the data processing system by way of main memory's MEMIN/MEMOUT busses. Referring then to FIG. 2A, MEMOUT bus 318 is an extension of MEMOUT 318 of FIG. 1-B. MEMIN bus 320 is an extension of MEMIN bus 320 of FIG. 1-B. MEMOUT extension bus 402 connects MEMOUT bus 318 to mantissa 408. Likewise, MEMIN extension bus 406 connects MEMIN bus 320 to mantissa 408. Internal to mantissa 408 is shown FPAC 408A, comprised of eight separate registers, four of which are user accessible general purpose registers and the other four being internal temporary storage registers. This accumulator block or grouping will be referred to in more detail later.

Next, referring to control 409, it receives instructions from instruction bus 400, also shown in FIG. 1A as a bus deriving instructions from IR 346. Control 409 is connected by way of output 401 to mantissa 408 as shown in FIG. 2A. A second output from control 409 is conducted on bus 405 to exponent/sign 410.

Interface block 200 provides an input by way of bus 200A to control 409. This bus is shown bi-directional for purposes of illustrating that the control signals are passed back into the interface 200 by the same bus 200A. Bus 400A provides signal inputs to interface 200 from micro IR 344 shown in FIG. 1A, and bus 400B provides outputs from interface 200 to microinstruction logic 342 again shown in FIG. 1A. Interface 200 also derives clock signals from the clocks input shown which is taken from power supply 300 in FIG. 1A. More discussion about these clocks will be presented later.

Referring next to mantissa 408, its outputs are provided by way of hex zero bus 407 and working register bus 404 to exponent/sign circuitry 410. Output of exponent/sign circuitry 410 is provided by way of hex shifter code input bus 403 to mantissa circuitry 408. Exponent/sign 410 also includes a bank of accumulators designated FPAC 410A, again four of the eight separate registers being user accessible general purpose type and the other four being internal temporary storage type. State signal inputs to control 409 are derived from mantissa 408 and exponent/sign 410 as shown in FIG. 2A.

Still referring to FIG. 2A, in operation, data inputs are provided from MEMIN bus 320 or MEMOUT bus 318 to floating point unit 490 by way of mantissa 408, and specifically by way of the working register (not shown in this Fig.) contained in mantissa block 408. Working register 468 (shown in FIG. 5 and about which more will be discussed later in connection with FIG. 5) is connected by way of working register bus 404 to exponent/sign bus 410, and accordingly data which is stored within mantissa block 408 and within designated registers of FPAC 408A is also stored by way of working register bus 404 in the exponent/sign circuitry 410 and specifically in the selected registers of FPAC 410A. This loading of designated registers and accumulators in both mantissa 408 and exponent/sign 410 is responsive to a particular instruction derived from instruction bus 400 by way of control 409 and conducted through outputs 401 and 405.

The next sequential macroinstruction is received by instruction bus 400 from instruction register 346 of FIG. 1A. This next instruction is temporarily stored in an instruction register (not shown in FIG. 2A) contained within control 409. This instruction is decoded resulting in a starting address being conducted to address a microprogram control store (not shown in this FIG.) within control 409. Output from this control store about which more will be said later are control signals which are conducted by way of outputs 401 and 405 to mantissa and exponent/sign circuitries respectively. Mantissa operation is controlled by control signals and simultaneously exponent/sign operation is controlled by other control signals all derived from the control store within control 409. These respective operations can be addition, subtraction, multiplication, division, or other operations that may be needed. Thereafter, a floating point number result is provided and stored within FPU 490 pending further usage in the overall computing operation upon further successive instructions from instruction register 346 of FIG. 1A.

The foregoing was a brief interconnection description and operation description of the floating point unit in a broad functional manner. Prior to describing each of the control, mantissa, and exponent/sign embodiments in further detail, discussion will first be directed to CPU/FPU interface control and clock circuitry 200. In this connection refer to FIG. 2C where signals between the power supply, FPU, and CPU of a clock nature or basic interfacing nature are shown. The control interface between CPU and FPU consists of eight control signals, four driven from the CPU and received by the FPU and four driven from the FPU and received by the CPU. The four signals from the CPU are: FPUCPU, FPMEM, FPABORT, FPINST. The other four signals from the FPU to the CPU are: FPTB (Floating Point Trap or Busy), FPB (Floating Point Busy), FPSKIP1, and FPSKIP2.

FPCPU is used to alert the FPU that data is either going to be written to or read from the FPU; this signal alerts timing circuitry to begin counting memory clock cycles to determine when to drive FPU data onto the MEMOUT bus or receive data on the MEMOUT bus. FPMEM is a signal that alerts the FPU that it will either read data from memory or write data to memory; upon issuance of FPMEM the timing circuitry or generator will again count proper number of MEM clock pulses to determine when it will either receive data from MEMOUT bus being written to the FPU bus or will transmit data from the FPU to the MEMIN bus to be written into memory. FPABORT is a signal issued by the CPU in two cases: (1) If an illegal memory reference has been made to memory or (2) To stop execution of the current floating point instruction in progress. FPINST (Floating Point Instruction) is generated by the CPU to alert the FPU that data on instruction bus 400 is now valid data and should be interrogated by the FPU to determine the starting address of the instruction being issued.

The following signals are transmitted by the FPU to the CPU and are used by the CPU to monitor state of the floating point unit. FPTB is interrogated by the CPU after the issuance of floating point instruction in order to alert the CPU to the fact that the instruction may be a second instruction and that the FPU has not yet finished executing a previous instruction. FPB is a signal which will either cause the CPU to stop executing further code until the busy signal in the previous floating point instruction now being executed is completed, or, if the floating point is not busy and the floating point trap is set this signal causes the CPU to default to the floating point trap handler to resolve the error that occurred in the last floating point instruction; the present floating point instruction is not executed until this trap is resolved. FPSKP1 is a signal representative of the state of the floating point status register and can cause selection of any one of fifteen test conditions testing the contents of the floating point status register and various combinations thereof. FPSKP2 is a signal issued by the FPU to indicate to the CPU to halt executing further code until the FPU indicates that further data may be accepted.

Figure 2C:
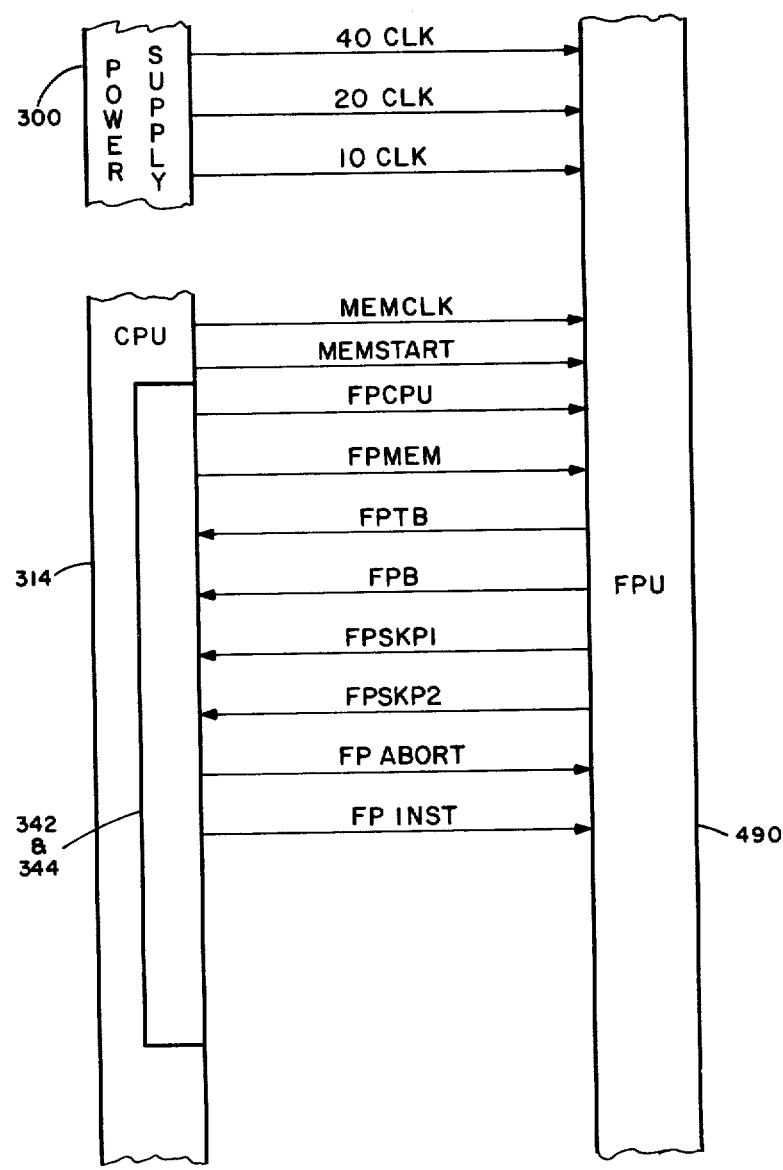
FIG. 2C is a schematic diagram showing clock signals and certain basic interfacing signals' directional flow as between power supply, the FPU, and the CPU.

Still referring to FIG. 2C, the four signals not yet discussed are MEMCLK, 40CLK, 20CLK, and 10CLK. MEMCLK is a clock signal which runs at the same frequency as 10CLK, namely, 10mhz, but is a clock signal which is controllable by memory to turn off or turn on as required. MEMCLK provides the appropriate timing for MEMIN and MEMOUT bus signals so that events can occur on those busses in accordance with 100 nanosecond time intervals. Clocks 40CLK, 20CLK, and 10CLK are simply clock signals of 40mhz, 20mhz, and 10mhz, respectively. These clock signals are obviously supplied by power supply 300 directly to FPU 490.

Referring next to FIG. 2B, detailed circuitry construction of interface 200 is presented. As noted, the circuitry construction employs standard flip-flops, gates, and inverters. Those signals not covered above with regard to FIG. 2C will be discussed in connection with this circuitry.

WRITECPU is a signal generated by the floating point to indicate to the interface that the next cycle will be data written to or from the CPU. VALID FPCCPU is a signal that is derived from FPCPU and MEMSTART which indicates that time is appropriate to start counting memory clock cycles to determine when to drive or respond to signals on various MEM buses. WRITE MEM is a signal generated by the FPU to indicate that data is to be written from the FPU to memory. FMEMCLK is identical to earlier described MEMCLK, except that this signal is internally used by the floating point unit. MEMSTART is a signal issued by the CPU to indicate that memory should now begin executing the current request that may be pending. CLRPAUSE (Clear Pause) is a signal to the FPU clock generator to begin to let the FPU clock run 100 nanoseconds after execution of this signal. IRESET is an internal reset signal that will reset the state of the floating point unit. PORT EN (Port Enable) is a timing signal used to generate 50 nanosecond pulses or granularity and occurs 25 seconds after the rising edge and falls 75 seconds after the rising edge of 10CLK. T100, T200, T300 are internal timing signals used to indicate that 100, 200, or 300 nanoseconds respectively have elapsed since the FPMEM or VALIDFPCPU signals have been received.

Continuing with a discussion of these signals, I/O CYCLE is a signal generated by the FPU which halts the FPU clock until a CLR PAUSE signal is issued. F10 CLK and F20 CLK are two clock signals identical respectively to 10CLK and 20CLK; these signals are used internally in the floating point unit. TRAP is a signal generated by the floating point unit to indicate that an error has occurred in execution of previous floating point instruction. BUSY is a signal internal to the floating point unit indicating that the floating point unit is currently executing a floating point instruction. FPI is a signal derived from FPINST, and is used by the interface circuitry to indicate that a current floating point instruction has been issued by the CPU which will last 150 nanoseconds, (this signal is derived from FPINST which can last for an undetermined amount of time, but signal FPI will last only for 150 nanoseconds). RESTART is a signal issued by the FPU which will essentially reset the FPU into an idle state, and wait for a further floating point instruction; this signal is issued as a result of FPABORT. RE is a signal issued by the interface to enable starting address decode ROM. CLRINST (Clear Instruction) is a signal issued by the interface circuitry to overwrite the current address in the starting address register. WRE (Write Register Enable) is a signal which indicates that a real instruction which is currently being decoded by the starting address decode ROM should be loaded into the starting address register. CREN is a signal which is employed to clear the register enable. 150 EN is a signal issued to the interface to indicate that the FPU clock is now running at 150 nanosecond intervals, and that the floating point unit is busy, and therefore it is not the appropriate time to load any starting addresses into the starting address register. CRE is a signal used to generate the 150 nanosecond interval of FPI. CMD (Command) is a signal which indicates that there is a current floating point instruction being issued by the CPU. CLRCMD (Clear Command) is a signal which clears the current command in the command register and also replaces the starting address with the idle state address. STATE is one of the signals that generates CLRCMD along with IRESET.

Having thus described the interface circuitry in detail, including the signal information associated with the operation of the interface circuitry, we now turn to the detailed description and operation of each of the major functional blocks of FIG. 2A, namely, control block 409, mantissa block 408, and exponent/sign block 410. Referring then to FIG. 3 wherein the architecture comprising the control function is depicted, instruction bus 400 provides an input to the remainder of the control circuitry by way of floating point instruction register

411, to both starting address decode ROM 412 and source and destination accumulators register 428. (With reference to FIGS. 3, 4, and 5, all bus interconnections are shown to have a particular bit capacity by the number which is associated with a line intersecting a portion of the bus. For example, bus 434 interconnecting register 428 and logic block 429 carries four bits.) Output from decode ROM 412 is provided to starting address register 413 by way of 8 bit bus. Output of starting address register 413 is conducted by way of starting address bus 414 to microprogram address selector 415 as one input thereof. A second input to microprogram address selector 415 is derived from N-way branch control ROM 422 by way of N-way branch address bus 423. Control ROMs 422 receive 15 test condition signals from various points of interrogation or testing within the floating point unit; (these 15 test condition signals are listed below and immediately after this description of the interconnections of FIG. 3). Output from microprogram address selector 415 is provided by way of bus 417 and bus 418 to control store ROMs 419.

Returning to the lower left-hand portion of the diagram, source and destination accumulators register 428 provides an output by way of earlier-mentioned bus 434 to FPAC address selection logic 429. A second input to this logic is derived from microprogram data bus 420 and from selected bits within that bus; (bus 420 is shown in the upper right-hand portion of the diagram as containing 72 bits, eight bits of which are employed by FPAC address selection logic 429). Output from logic 429 is provided by way of FPAC selection bus 435 to pipeline register 401 and 405. Referring to the lower left portion of FIG. 3, additional test conditions also derive from various points of interrogation within the floating point unit are provided to test MUX 430; (again, these signals are provided immediately following the description of interconnection of FIG. 3). The output of test MUX 430 is a single bit input to address selection logic block 431 comprising a register and a multiplexor. Other inputs to this logic block are derived by way of true and false bus lines from microprogram data bus 420, these true and false bus lines each containing four bits of information. Output from address selection logic 431 is provided by way of four-bit control address selection bus 432 to microprogram sequencer 425. Finally, output of sequencer 425 is provided by way of three bit control address selection bus 424 to microprogram address selector 415. Selector 415 and Sequencer 425 in combination comprise microprogram controller means.

Referring to pipeline register 401 and 405, this pipeline register receives a 72-bit input from microprogram data bus 420 and a 40-bit input from random state controller 427. Pipeline register outputs provide inputs to the exponent/mantissa source destination address bus 436 and to branch address bus 416 which latter bus provides the third input to microprogram address selector 415.

This paragraph contains definitions of various signals that appear at the input of N-way branch control ROMs 422 in FIG. 3: OUR (Out-Of-Range) is a signal which indicates that during a shift operation there is more than 15 hex digits being required to be shifted; ECO (Exponent Carry-Out) is a signal representing carry-out of the exponent ALU; EZ (Exponent Zero) is a signal which indicates that the twos exponents source and destination accumulators have equal value; SGNR (Sign of Result) is a signal which compares sign of the twos source and destination exponents; AOS (Add Or Subtract) is a signal which indicates that the present operation is an add or subtract operation; D8 is a signal which indicates the most significant bit of the Mantissa word; EA0 is a signal which represents the sign bit of destination accumulator 428; FT0, FT1, FT2, and FT3 are signals representing floating point transfers to main memory where zero is intended to indicate the first floating point accumulator contents have been transferred and "3" is intended to indicate that contents of the fourth floating point accumulator have been transferred; FZ (Fraction Zero) is a signal which indicates that the mantissa portion of FPAC 408A is zero; MUL is a signal which indicates that the current instruction being executed by the FPU is a multiply instruction; SING is a signal which indicates that a single precision operation is currently being executed by the FPU; and SCALE is a signal which indicates that the mantissa word is not normalized and that normalization is thus required (more to be presented on normalization later in connection with FIG. 10).

Contained in this paragraph is a definition of the signals which appear at the input to test MUX 430:FC0 (Fraction Carry Out) is a signal representing carry-out of the Mantissa portion of the FPAC; FZ (Fraction Zero) as before, this is a signal which indicates that the Mantissa portion of the FPAC has whole zeros; DONE is a signal which indicates that a multiply or divide operation has been completed; D8, as before, is a signal representing the most significant bit in the Mantissa; EA0 as noted before, is a signal representing the sign of the destination FPAC and is used to test that sign; EN4 is a signal which represents the precision of the instruction, i.e., whether the present instruction will be double precision or single precision; and FT3 (Floating Transfer 3) is a signal which indicates that contents of the fourth floating point accumulator have been transferred to memory.

Before continuing with the remainder of the architecture description of FIGS. 4 and 5, it may be instructive to introduce at this point a description of operation of microprogram controller means (selector 415 and sequencer 425) shown in FIG. 3 and described above. These two components are commercially available as parts 74S253 and AMD2911, respectively. For this operative description, refer to Table 1:

TABLE 1

| STATE OR CYCLE | FLOATING POINT UNIT MICRO-ADDRESS SELECTION | | | | | |
|---|---|---|---|---|---|---|
| | MS 0-3 | M-PC | STKO | ADDR | COMMENTS | PRINCIPAL USE |
| PCONT EXEC. | 0001 | N | J | N | Push Micro PC to STKO. | Set up for looping on a constant address, in multi-ply/divide cycle. |
| FETCH CONT EXEC. | — 0011 | N + 1 N | N + 1 J | — N | Continue. Continue, no change | Execute next sequential |

TABLE 1-continued

FLOATING POINT UNIT MICRO-ADDRESS SELECTION

| STATE OR CYCLE | MS 0-3 | M-PC | STKO | ADDR | COMMENTS | PRINCIPAL USE |
|---|---|---|---|---|---|---|
| FETCH | — | N + 1 | J | — | in stack, | instruction. |
| POPJ EXEC. | 0100 | N | J | J | Jump to address in STKO. | Provides a return linkage from subroutine. |
| FETCH | — | J + 1 | K | — | Pop stack, | |
| LOOP EXEC. | 0111 | J + 1 | J | J | Loop on STKO. No change in stack, | Loop until external test becomes true. |
| FETCH | — | J + 2 | J | — | Jump to | |
| SA EXEC. | 1100 | N | J | SA | starting address, | Vector to start of instruction microcode, |
| FETCH | — | SA + 1 | X | — | Jump to | Enter subroutine. |
| PUSHJ EXEC. | 1101 | N | J | BA | branch address. | Push return address to STKO, |
| FETCH | — | BA + 1 | N + 1 | — | Push stack. Jump to | |
| NWAY EXEC. | 1110 | N | J | N-WAY | N-WAY branch address. | Select 1 of 255 addresses, based on multiple test conditions. |
| FETCH | — | NWAY + 1 | J | — | No change in stack. | |
| JUMP EXEC. | 1111 | N | J | BA | Jump to branch address. | One of two possible addr's on cond. branch. |
| FETCH | — | BA + 1 | J | — | No change in stack. | |

The terminology of Table 1 is defined as follows: (1) STKO is the location addressed by the stack pointer located in sequencer 425; (2) X=don't care, (contents of STKO, and don't care what it is at this time); (3) M−PC=microprogram counter located in sequencer 425; (4) ADDR=microprogram address on bus 418; (5) J=contents of STKO; (6) K=contents of STK1 (STKO is the first location, STK1 is the second, etc.); (7) N=current value of microprogram counter in sequencer 425; (8) SA=starting address in register 413; (9) BA=branch address in branch address bus 416; (10) N-WAY=the microprogram address will be 1 of 255 possible addresses determined by machine test conditions, on bus 423; (11) EXEC.=execution cycle of current microinstruction; (12) FETCH=the fetch of the next microprogram address during the execution cycle of the current instruction; (13) POPJ=pop jump; (14) PUSHJ=push jump; and (15) PCONT=push continue.

Table 1 summarizes action of address selector 415 and sequencer 425. Briefly, the microprogram controller can be viewed as two four-input multiplexors that are used to select five possible microinstruction address sources. The first multiplexor selects the microprogram counter or stack. The second selects either the starting address, N-way branch address, or jump address as the source of the next microinstruction address. Together these form a tightly coupled micro-address selection mechanism controlled by MUX-select bits MS0-MS3 on bus 432.

In Table 1, PCONT means Push Micro PC to "top" of the stacks, STKO, and continue to the next microinstruction. During execution of PCONT cycle, the Micro PC (M-PC) will contain the current M-PC address (as indicated by N); top of the stack (STKO) will contain its current contents (J) unaltered, and the address will be the current M-PC (N). Fetch of the next instruction during this PCONT execution M-PC will be incremented by one (N+1), and STKO will receive M-PC plus one.

CONT cycle is the continue cycle, microaddress being the current value of M-PC. No change in STKO occurs. On the concurrent Fetch cycle, N+1 is loaded into the M-PC. Principal use is to execute sequential instructions through microcode.

POPJ is the next cycle, where contents of STK1 now become contents of STKO. During its concurrent Fetch operation, M-PC will contain the previous contents of STKO, labelled J+1, and STKO will contain previous contents of STK1.

LOOP is the next instruction cycle or state, and it will provide to the microaddress bus, the contents of STKO. This address will be continually presented to the microprogram address bus internal to block 415 until an external test condition becomes true. This state is principally used in multiply/divide, where such operation on mantissas requires a predetermined number of clock cycles to finish.

SA (starting address) is presented from register 413 to microprogram address bus internal to block 415. The M-PC (microprogram counter) on the Fetch of the next instruction, will contain the starting address plus one. STKO will contain "don't care" data which is not used.

PUSHJ is used to enter a subroutine and then provide return linkage to the top of STKO. The current microprogram counter plus one will be pushed onto STKO, and the current microaddress will be supplied by Branch Address (BA) bus 416, to the microprogram address.

N-WAY address bus 423 provides current address on the microprogram address bus; and, on Fetch of the next instruction, M-PC will contain N-Way address plus one.

Finally, JUMP is used to jump to an absolute address in microcode, principally during a two-way test condition, where JUMP is one of the branch addresses. During Fetch of the next instruction, M-PC will obtain BA+1 (Branch Address plus one).

Having thus described the general connection of components within the control block diagram of the floating point unit and the operation of the floating point unit microaddress selection circuitry, refer next to the exponent/sign portion of the block diagram of the floating point unit, FIG. 4. In the upper left-hand corner of FIG. 4, exponent/sign data MUX 437 receives three inputs from three busses, bus 404E from the working register (FIG. 5 to be discussed later), exponent function bus 449, and exponent multiplexor bus 447. Output from exponent/sign of data MUX 437 is provided by way of exponent/sign data bus 438 to exponent/sign storage RAM 439. A second input to this RAM is derived by way of exponent source/destination address bus 440. Sign control 441 receives input from sign storage block 439 and provides an output in return thereto. Two outputs from exponent/sign storage block 439 are provided by way of exponent destination bus 443 and exponent source bus 444 to exponent ALU 448 and exponent MUX 445 respectively. Output of exponent MUX 445 provides a second input to exponent ALU 448 by way of exponent multiplexor bus 447. A second input to exponent multiplexor 445 is derived from bus 446 which derives constants from microprogram data bus. Output of exponent ALU 448 is provided by way of exponent function bus 449 as noted earlier back to multiplexor 437 and also to absolute value look-up table ROM 450. Hex zero bus 407, being derived from microprocessor slice 457 (FIG. 5 to be discussed later) provides an input to hex shift priority encoder 453, output of which is provided by way of bus 454 to hex shifter code input bus 403. Other inputs to hex shifter code input bus 403 are derived by way of bus 451 from look-up table 450 and by way of bus 452 from microprogram data bus.

Turning next to FIG. 5, referring to the upper left-hand portion of this Mantissa block diagram, look-head carry logic 455 provides an input on bus 456 to microprocessor slice block 457. Other inputs to this block are from Mantissa source/destination address bus 458 and working register bus 404. Outputs from microprocessor slice 457 are directed by way of hex zero bus 407 back to FIG. 4 and as noted earlier to priority hex shift encoder 453. The other output from microprocessor slice 457 is provided by way of Mantissa function bus 459 to four multiplexors: working register input multiplexors 460, 461, 462, and 463. These inputs are provided by way of busses labelled respectively 459a, 459b, 459c and 459d. Other inputs to these multiplexors are derived from working register bus 404a, and again, respectively are input busses 404b, 404c, 404d. The other input to multiplexor 463 is not derived from the working register bus, but is derived from MEMBUS by way of FPU MEMBUS MUX 474 and its bus 474a. Inputs to this MUX are derived from MEMIN bus 320 and MEMOUT bus 318 in turn deriving their inputs from MEMIN bus driver 472 and MEMOUT bus driver 473 respectively. The MEMIN bus driver derives its inputs from busses 474b and 472d as does the MEMOUT bus driver. Outputs from multiplexors 460, 461, 462, and 463 are provided by way of parallel input data busses 464, 465, 466, and 467 respectively to working register 468. Output of working register 468, as noted above, besides being provided to microprocessor slice 457 is also provided by way of hex shifter input bus 469 to hex shifter 470. Hex shifter 470 receives a second input from hex shifter code input bus 403 (from FIG. 4). Another output from working register 468 is provided on bus 472d and provides the working register bits 8–15, the inputs to MEMIN and MEMOUT drivers 472 and 473 respectively.

Finally, output of hex shifter 470 is conducted on hex shifter output bus 471, which bus is connected back into working register 468. The circuitry of FIGS. 3, 4, and 5, including the decode ROMs, address registers, address selectors, microprogram sequencers, branch control ROMs, multiplexors, control store ROMs, ALU's, ROM look-up tables, hex shifter encoders, microprocessor slice, and other registers and shifters are all standard electronic integrated circuit components available commercially on the open market.

Prior to describing the operation of the floating point unit in detail, it may be helpful to present a discussion of FIGS. 6–10 which illustrate certain features of and used in the present invention. Accordingly, the data bus output format of microprogram data bus 420 as shown in FIG. 6 is next presented. This output format consists of nineteen control signal groups, the first being Mantissa carry-in which has one bit associated with it; this determines the carry-in to the Mantissa microprocessor slice block 457. The Mantissa ALU function has three bits which control the ALU function inside microprocessor slice block 457. Mantissa ALU source has three bits and controls the source ALU for microprocessor slice block 457. Next, the Mantissa ALU destination employs three bits to control the destination accumulator within microprocessor slice block 457. Mantissa address source employs three bits to control source accumulator in microprocessor slice block 457. Exponent address source comprises three bits which control the address source in exponent/sign storage block 439 (FIG. 4). FPAC register select uses twelve bits as the microprogrammed source and destination address derived from microcode. Next, exponent ALU function comprises three bits to control the ALU in exponent ALU block 448 (FIG. 4). Next, the sign control field comprises two bits which controls sign control block 441. The exponent register control field comprises four bits to control exponent/sign storage block 439. Clock select field comprises two bits which control the floating point clock. Next, the state field comprises one bit which is responsible for the following: It controls the floating point busy condition; it loads the current IR source and destination bits made up of IR bits 1–4; and it clears the starting address register during the fetch of the starting address. Next, true microaddress select is a field made up of four bits and used to select bits MS0-3 if the test condition is true. By contrast, false microaddress select is a field made up of four bits and used for selecting the false address and is further used as a generation of various constants used by exponent MUX block 445 (FIG. 4). Working register control field comprises two bits and controls the working register to either shift left, shift right, hold, or parallel load. Next, test condition select is a field comprising three bits which selects the test condition currently interrogated in block 430 (FIG. 3). Literal field comprises nine bits and controls either the branch address or various decode ROMs which in turn would provide random control throughout the FPU. Next, random field comprises six bits which provide random control to be decoded throughout the FPU and further enables random control decoders. Finally, state control field comprises four bits and controls residual states throughout the FPU.

Figure 7:
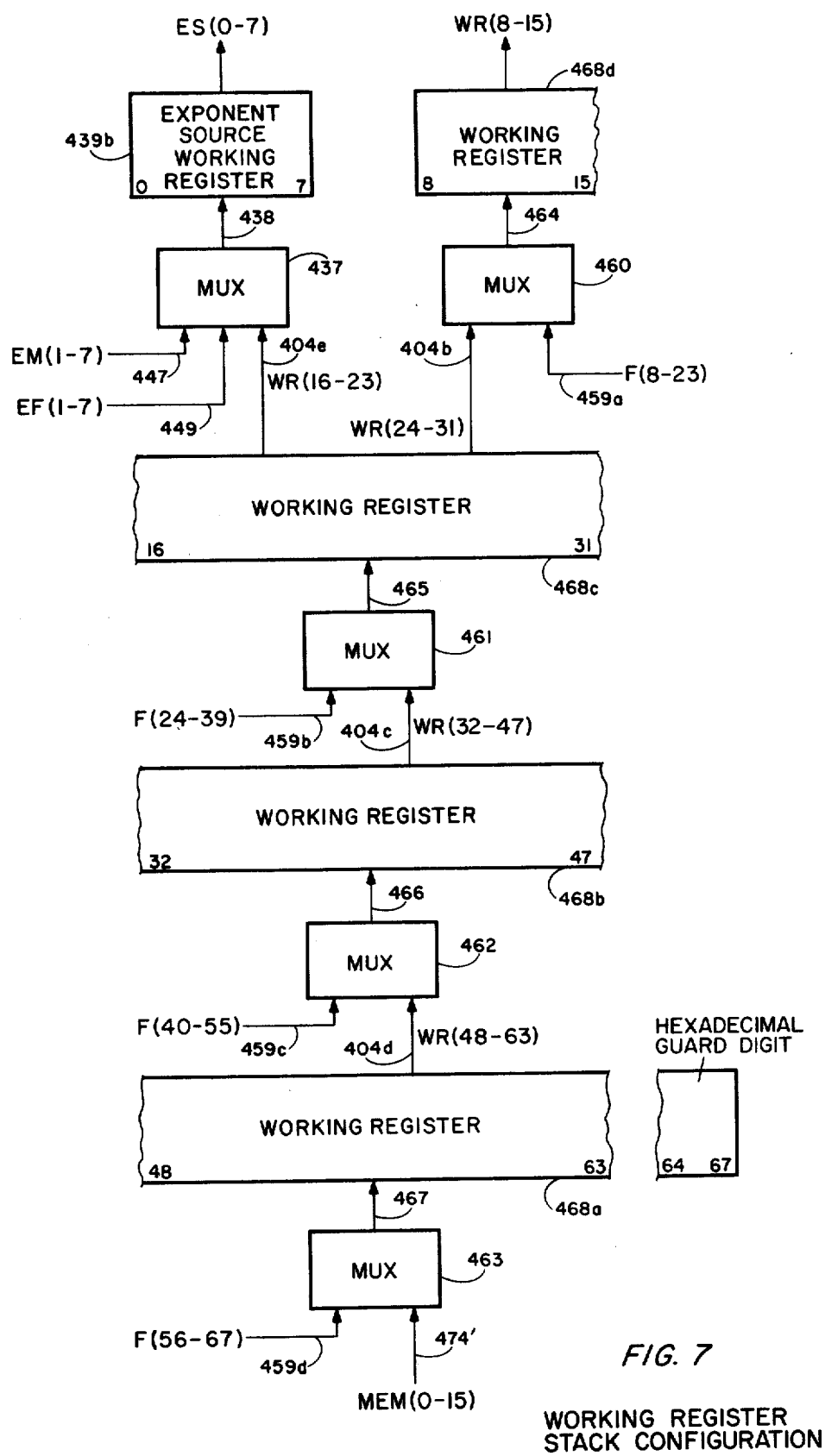
FIG. 7 is a block diagram of working register 468 shown in a stack configuration.
Figure 8:
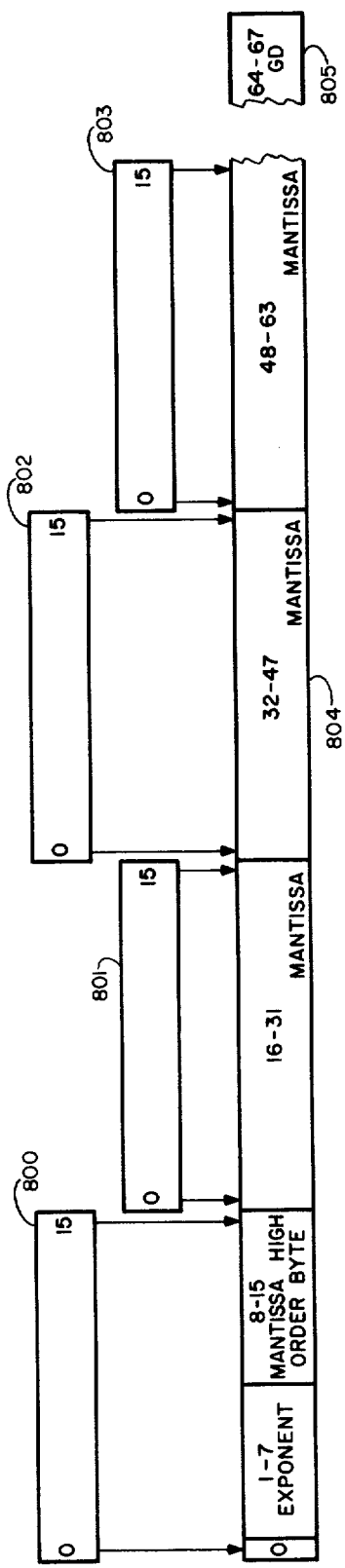
FIG. 8 is a schematic representation of a floating point word as it would be stored in memory 313 and as it would be representated in floating point unit 490.

By-passing discussion of FIG. 7 for the moment, refer next to FIG. 8. FIG. 8 represents a floating point word, where blocks 800, 801, 802, and 803 are words contained in main memory 313 (FIG. 1A). Block 804 is the major portion of the floating point word contained in the floating point unit and corresponds to words 800–803 as depicted. The arrows connecting various blocks show how words in memory are transferred to the appropriate FPAC for use by the floating point processor in performing its various calculations. Extra bits 64–67, designated 805 in FIG. 8 represent four bits used as a guard digit. Essentially, these extra spaces are available should the floating point word require extra room for manipulating whereby additional accuracy or precision is not lost for a four-bit shift to the right. The high order byte of block 800 when transferred to the floating point unit will be received in the exponent and sign section, (FIG. 2A) register file 410A, in the user accessible group of registers. This byte will be contained in the destination accumulator selected by IR bits 3 and 4. The low order byte of word 800 and words 801, 802, and 803 will be stored in mantissa block 408A (FIG. 2A) and will be contained within one of the FPAC registers designated user accessible general purpose registers. Summarizing, FIG. 8 shows four words 800 through 803 stored in main memory which are collectively brought into one of the FPACs in FIG. 2A in a particular manner so that word 800 is used as the sign plus exponent plus the highorder byte of Mantissa and the other three words are inserted into the FPAC in those locations corresponding to additional Mantissa information; guard digit 805 and the bits of the exponent and Mantissa are 68 bits long in total and all contained within one of the modules of FPAC file 408A or 410A.

Figure 9:
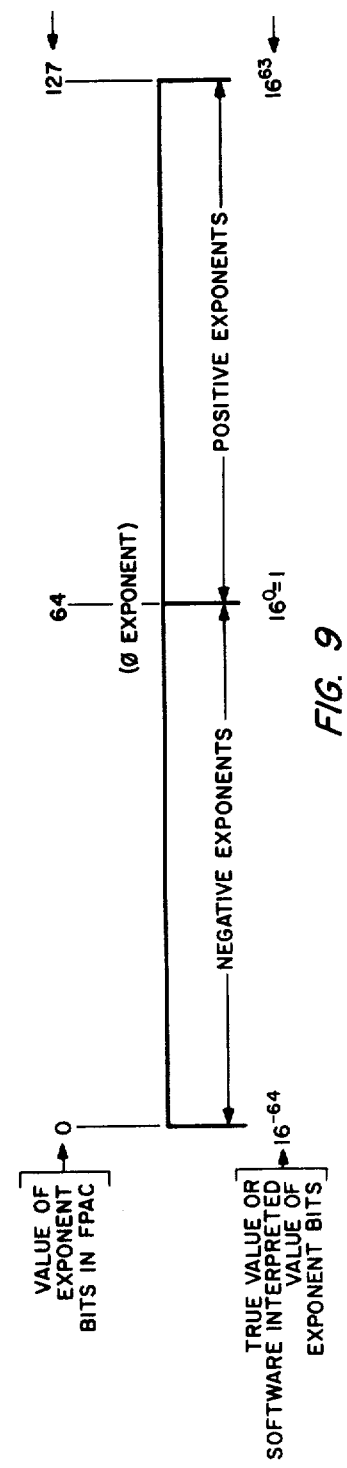
FIG. 9 is a schematic representation of excess 64 notation employed in manipulations by the exponent function.

Next, referring to FIG. 9, a discussion of "excess 64 notation" is presented. As is known in the art, floating point processor Mantissa's are fractional values, and the exponent associated with that Mantissa is either positive or negative depending upon whether the floating point word (the Mantissa and the exponent taken together) is supposed to be greater than or less than zero. In this manner, large numbers and small numbers can be efficiently expressed. For example, referring to FIG. 9, where the Mantissa is known to be able to employ 64 binary bits (in 16 hex digits) the maximum number is a Mantissa of all one's times $16^{63}$; by contrast, the smallest number expressable is all zero's in the Mantissa but for the last position which contains a one times $16^{-64}$. However, in order to accurately characterize the number, the positive or negative nature, the sign, of the exponent is crucial. In order to maintain information relative to sign of the exponent locations would be inefficiently employed. The excess 64 notation scheme is used to save requirement of carrying the sign of the exponent around during calculations. Essentially, the value 64 is added to the absolute value in the exponent and interpreted as follows. Referring to FIG. 9, if the exponent contains the value 64, this is interpreted as being a zero. If the exponent contains the value 127, this is interpreted as 63. If the exponent contains a zero, this is interpreted as −64. As shown in FIG. 9, negative exponents are values that are greater than or equal to zero or less than 64. Positive exponents are 64 through 127.

Figure 10:
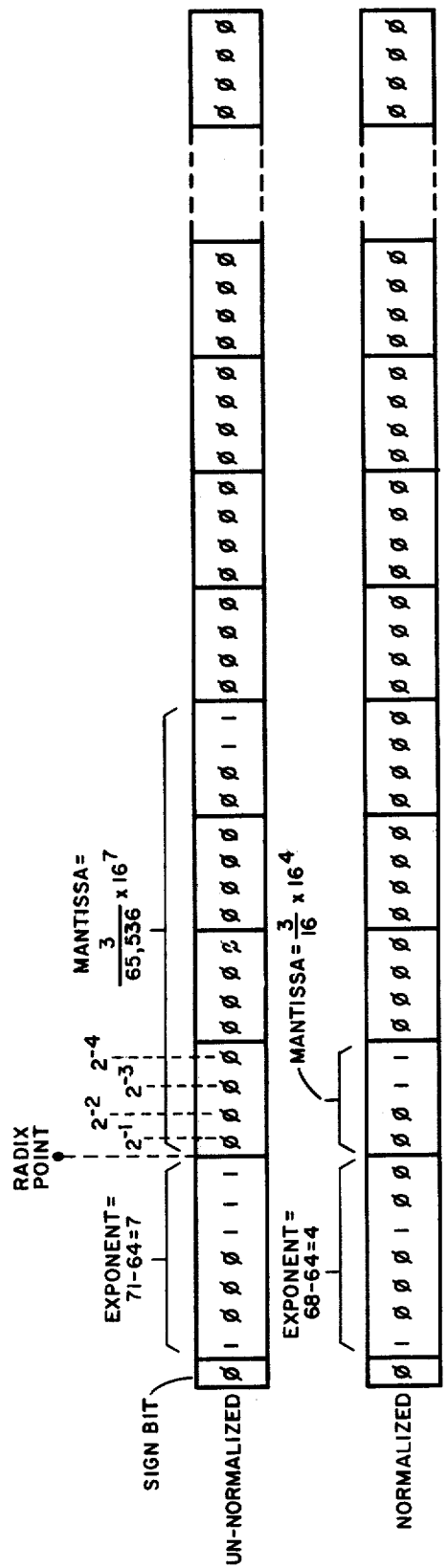
FIG. 10 is a schematic representation of an un-normalized and its corresponding normalized floating point word.

Referring next to FIG. 10, a normalized and unnormalized floating point word is shown. In the unnormalized word, the exponent is equal to 71 minus 64 or equal to 7. The three one's to the right of the exponent word are equal to 7, and the one in the next to the left most position is equal to 64, using ordinary binary conversion techniques. By contrast, in the normalized word, the exponent is equal to 68 minus 64 or 4. However, the point of FIG. 10 is not to particularly highlight the exponent values but to explain the difference between normalized and unnormalized word as follows.

Normalization is used to increase precision of floating point number residing in a limited number of hex digits (each group of four binary bits shown is a single hex digit) in the floating point unit. In FIG. 10, an unnormalized number represented by 3/65,536 times $16^7$ is initially loaded into FPAC 408A or 410A. It is examined for leading hex zero's and determined that there are three in this particular case. In other words, there are twelve zero's associated with the first three hex digits, plus another two zero's before the first non-zero binary digit occurs, and this can be considered to be equal to $\frac{1}{2}^{15}$ plus $\frac{1}{2}^{16}$, or $2/2^{16}$ and $\frac{1}{2}^{16}$, or $3/2^{16}$, and $2^{16}$ equals 65,536. Normalization occurs when the leading hex digit is a non-zero value, as shown in FIG. 10 "normalized". Since the first non-zero hex digit is moved three places to the left, the exponent is reduced by a value of 3, therefore, the exponent is now equal to 68−64 equals 4. Also, the mantissa is now equal to $\frac{1}{2}^3$ and $\frac{1}{2}^4$ which is equal to 3/16. The important point is that 3/16 times $16^4$ which is the value of the normalized number is precisely equal to 3/65,536 times $16^7$; this can be verified by simple arithmetic.

Normalization is defined as the high-order hex digit containing a non-zero number, or in other words, normalization is that condition where at least one bit which is a non-zero bit is contained in the most significant hex digit. The purpose of normalizing is to increase the capacity of the Mantissa in the FPAC to assume more precision by having the capacity to accept more bits.

OPERATION

In operation, reference will be made to FIGS. 3, 4, 5 and 7 together in order to best describe operation of the FPU. It should be understood that the FPU can perform a large number of operations and in fact can perform more than sixty such operations including the add operation, the subtract operation, the multiply operation, the divide operation, the push operation, and the pop operation. For purposes of illustrating FPU operation, these six operations will be described in detail employing typical numbers in the illustration, immediately after the following definition of several terms:

TRAP—A floating point Trap is a signal indicating a floating point fault condition which condition might, for example, result from the floating point unit attempting to handle unmanageable data, e.g., divide by zero, etc.;

PUSH FLOATING POINT STATE—This is an instruction which saves the current contents of the floating point unit on an 18-word block in a particular reserved portion of main memory, sometimes referred to as the user stack;

POP FLOATING POINT STATE—This is an instruction which permits the previously mentioned 18-word block to be re-written from the user stack back into the floating point unit; and VECTOR—The term Vector is similar to the term address, but Vector has an added quality or dimension in that it addresses a particular microcode location, where an address would merely normally apply to picking the next sequential location in a series of microcode addresses.

By way of example, five possible operating states of the floating point unit which affect the manner by which the hardware operates on the input instruction are:

(1) FPU not busy from previous instruction and FPU instruction is received, TRAP not set;

(2) FPU not busy from previous instruction and FPU instruction is received, TRAP is set;

(3) FPU busy processing the previous instruction and another FPU instruction is received, TRAP not set;

(4) FPU busy processing previous instruction and another FPU instruction is received, TRAP is set; and (5) Store FPAC instruction, TRAP not set.

With state or condition number 1, an add/subtract operation will be discussed; for state number 2, push floating point will be discussed; in connection with condition or state number 3, multiply/divide operation will be illustrated; for condition or state number 4, pop floating point will be illustrated; and for state number 5, where the FPU is busy processing a previous instruction, a store FPAC instruction will be discussed.

State Number 1

Referring, as noted above, to FIGS. 3-5 and 7, assume that a computer instruction contains a floating point instruction to first load FPAC zero (FIG. 5, 457 and FIG. 4, 439; the FPAC's of FIG. 2A are located in these blocks). For the first operand number, for example, $1/16$ times $10^5$, the first bit is the sign bit of the operand, and the second bit is the sign of the exponent which, for this example are both positive. However, they are respectively denoted by zero and one. For this example, the instruction is received over instruction bus 400 and decoded with starting address decode ROM 412. The result of this decode operation is loaded into starting address register 413, and by way of starting address bus 414, selector 415, to control store address bus 418. This is a starting address or Vector which is presented to control store ROMs 419, which in turn supplies appropriate control signals necessary to load four operands from main memory into the floating point unit (more to be discussed about this loading operation in connection with timing diagram 14 to follow). Operands in this case will be present on MEMIN bus 320 being routed through FPU MEM bus MUX 474 and by way of bus 474A, MUX 463, and bus 467 to working register 468.

In FIG. 7, working register 468 is shown in a stack configuration which is more illustrative of its operation. Therefore, referring to FIG. 7, data on bus 467 is loaded into bits 48 through 63 of the working register. The second word of the four-word block is routed through the same data paths as previously described and loaded into bits 48 through 63 of the working register while the first word is routed through bus 404d and MUX 462 to bus 466 where it is loaded into working register 468b. Then, the third word again conducted through previously mentioned data paths is loaded into working register block 468a, the second word then being routed into working register 468b and loaded, the first word now residing in working register 468c. And finally, the fourth word, the last word, appears on bus 467 loaded into working register 468a, third word now residing in working register 468b, the second word residing in working register 468c, and the first word's high-order byte residing in working register 439b and the low-order byte residing in working register 468d. (For illustrative purposes, one may refer back to FIG. 8 for a pictorial description of the four operands in main memory and the resulting floating point word.) This description completes the loading description of the working register for a load instruction. At this point in time, data in the working register is stored in the specified FPAC in block 457 of FIG. 5 and in the specified FPAC in block 439 of FIG. 4. The Mantissa portion is stored in 457, and the exponent/sign portion is stored in 439. This description comprises the loading of one operand for the add operation.

In order to enable the floating point unit to carry out an add operation, loading of the second operand is of course necessary, but since loading of the second operand is almost identical to loading of the first, just described, for purposes of expediting description of operation, it will be assumed that the second operand had been loaded in its respective FPACs as needed. For purposes of illustration, the second operand will be chosen to the same as that shown in FIG. 10, normalized, 3/16 times $16^4$.

The two operands having thus been loaded, the next description relates to addition of the two operands in the floating point unit. Floating point addition consists of an exponent comparison and Mantissa addition. Exponents of the two operands are compared by performing a subtraction thereof in exponent ALU block 448. Result of this comparison is presented on bus 449 which addresses the absolute value look-up table contained within ROM 450. ROM 450 provides a hex shifter code output which is directed through bus 403 to hex shifter 470. In this example, the hex shifter code is equal to one and will shift contents of the working register one hex digit to the right. The one hex digit shift is due to a difference of one in the exponents between the two operands. This shifted value is added to destination Mantissa located in microprocessor slice 457, and this added result will be written into the destination accumulator Mantissa, also located in block 457. (Slice 457 in the preferred embodiment is commercially available part number Am 2901A, provided by Advanced Micro Devices.)

At this point in the operation, a test is conducted by way of test MUX 430 (FIG. 3). If an overflow resulted from the add of the two operands, normalization must take place. In this example, however, overflow did not take place and therefore the Mantissa and exponent of the result are correct.

In this preferred embodiment, exponent comparison is accomplished by way of the N-way branch ROMs 422. Two operands are presented to exponent ALU block 448 and are subtracted. The result of the subtraction produces five state variables: OOR (out of range); ECO (exponent carry out); EZ (exponent zero) means source and destination accumulators are equal; SGNR (sign of the result) compares signs of source and destination accumulators; and, AOS (add or subtract) current cycle executed is add or subtract cycle.

These residual state variables are presented to N-way branch ROM 422 for addition and subtraction, resulting in an address being presented by way of the microprogram address selector 415 to control store address bus 418. N-way branch address ROMs 422 effectively reduce previous comparison functions to one cycle.

In this particular example, exponents are not equal and the exponent of the destination accumulator is greater than the exponent of the source accumulator. This will result in alignment necessary for the exponent source Mantissa. This Mantissa has been previously loaded into the Mantissa working register, as noted. The result of this comparison is examined by the absolute value of look-up table ROM 450, resulting in a hex shifter code. In this example, hex shifter code is 1, and the Mantissa word in working register 468 will be shifted one hex digit to the right, bits being shifted out of the right of the working register and being loaded into the guard digit capacity of the working register, FIG. 7. After this shift occurs, the Mantissa's of both operands are aligned and ready for addition. In this example, since the signs are equal, the Mantissa's are actually added together. Addition takes place in microprocessor slice 457. The source operand located on bus 404 presented to one input of slice 457 is added to the destination operand internal to the slice 457. The result of this addition is internally examined for Mantissa overflow. In this case, no Mantissa overflow has occurred, and the result of this addition is placed in destination Mantissa FPAC internal to slice 457. The destination exponent will be the exponent of the answer and this exponent is written into destination exponent circuitry located internal to exponent/sign storage block 439 in FIG. 4 (this block being commercially available as part number 74S 194). The sign in the destination accumulators also are the sign of the answer, and it is likewise written into the destination FPAC within block 439. Source and destination FPAC addresses are derived from IR bits 1–4. These pass through the FPAC selection logic 429 (FIG. 3), FPAC selection bus 435, and presented as addresses to exponent and Mantissa blocks 439 and 457. These bits specify the source and destination accumulators discussed in the above addition description of operation. The foregoing completes the present discussion of operation of addition in the FPU.

State Number 2

The same instruction will now be examined for the condition where a floating point TRAP is set from a previous instruction. Upon receiving an instruction to add, the floating point unit by way of starting address decode ROM 412 and starting address register 413 will jump to an even location in microcode contained in control store ROMs block 419. (Normally addresses that are executable will contain an odd address; even addresses result from the fact that TRAP had been set from a previous instruction). If the TRAP is set, the current instruction is not executed and the TRAP is initiated, monitored by the CPU, which takes appropriate action to determine cause of the TRAP and any necessary corrections that must be made. Starting address register is "flushed" of the starting address and overwritten with the idle address. The floating point unit will now loop on this idle address awaiting a new floating point instruction. Looping will consist of a starting address containing all one's. This address is put out on starting address bus 413 and microprogram address selector 415 will be selecting the starting address bus, which in turn will place on control store address bus 418 the above-mentioned address. This results in output of control store ROMs 419 doing effectively NOOP (No Operation) instructions at looping on the starting address bus address.

In other words the FPU is looping on a constant address that is contained in starting address register 413. In this particular case when it is idle, the starting address is all one's. This describes the condition where the FPU operates trying to do an "add" where the trap is set from a previous instruction where the add operation is not completed but where the FPU ignores the instruction and is looping in anticipation of a new instruction.

As noted earlier, comparison of exponents for add or subtract instruction is accomplished in the N-way branch ROMs 422. This comparison consists of a sign compare, an out-of-range condition, sign of the result of the compare, and whether these two operands are equal. These four conditions are presented to block N-way branch control ROMs 422 and result in one of eight Vectors, to the proper microcode operations for this particular set of operands.

State Number 3

For this state or condition, consider a multiply operation. This example employs the same illustrative operands used in the above discussion, and it will be further assumed that those operands are loaded as previously described. Floating point unit is busy processing a previous instruction and another floating point instruction is received. The new floating point instruction will be on instruction bus 400 and be loaded into floating point instruction register block 411. This instruction in turn will be sent to starting address decode ROM 412 and the resulting starting address Vector will be loaded into starting address register 413. Since microcode will not be responsive to the starting address bus, the starting address will be held until needed. Upon issurance of a new floating point instruction the floating point unit will be interrogated for a floating point "busy" signal. In this particular case, the FPU will be busy and the floating point busy signal will be sent to the CPU, thus stopping the CPU from executing any further code. As the FPU finishes a previous instruction, it will clear busy allowing the CPU to continue executing code. The FPU will then respond to signals on starting address bus 414, and immediately begin processing the current instruction that was previously loaded in starting address register 413. The starting address will be conducted by way of starting address bus 414 through microprogram selector block 415 to control store address bus 418. Upon address in control store ROMs 419, it will provide proper output control sequence to pipeline register 401 and 405.

For this multiply instruction being considered, current operation of exponent/sign mantissa are executed. The exponents are added and signs compared while at the same time mantissa's are being multiplied. For exponent addition, referring to FIG. 4 exponent/sign storage 439, the exponent source and destination values are added and written into the exponent destination accumulator. The exponent source and destination are added through exponent destination bus 443, exponent source bus 444 directed by exponent multiplexor 445 and exponent MUX bus 447 to exponent ALU 448. The result of this arithmetical manipulation is placed on exponent function bus 449 which is routed through exponent data selector MUX 437 to exponent/sign data bus 438, and written into exponent destination accumulator within block 439.

The next operation required to be performed on the exponents is to subtract out the excess 64 that resulted from the addition of two components which each contained excess 64. This is accomplished by placing 64 on constant bus 446, whereafter it is routed by exponent MUX 445 to exponent MUX bus 447. This provides one of the inputs to exponent ALU 448, in conjunction with the other input already described varying by way of exponent destination bus 443. These two exponent operands are subtracted within exponent ALU 448 resulting in the corrected exponent in excess 64 notation. This result is conducted by exponent bus 449 through exponent data selector MUX 437 to exponent/sign data bus 438 and is written into exponent destination accumulator within block 439. This completes discussion or description of the operation on the two exponent operands for a multiply example.

For the Mantissa's which are contained within block 457 of FIG. 5, the partial product is initially set to zero, and thereafter partial product multiplicand and multiplier contained within slice block 457 are multiplied in standard binary fashion with the final result stored in working register 468, by way of Mantissa function bus 459 and routed through working register input multiplexors 460 through 463. This product is now contained in the working register and is examined by way of N-way branch control ROMs located in FIG. 3, block 422, for a leading hex zero digit, zero, or normalized Mantissa conditions. Assuming that the product is not zero, and does not require normalization which would be the case for the operands that we had been discussing, then the result is correct as it is and is stored in block 457, the microprocessor slice of FIG. 5. At this stage of the operation, the two floating point numbers have been multiplied together, their exponent and sign resultants being contained in exponent and sign storage block 439, and designated exponent destination and Mantissa portion of the product being contained in microprocessor slice 457 in FIG. 5. This completes the present description of operation of FPU in accordance with state 3.

State Number 4

In state number 4, FPU is busy processing a previous instruction, and another FPU instruction is received. This FPU instruction is for purposes of illustration a "pop" floating point instruction. Also, the TRAP is set from the previous instruction which was for purposes of illustration a multiply instruction. For purposes of illustration it is assumed the previous instruction resulted in an error to permit the resulting TRAP being set.

Pop floating point instruction will ignore the fact the TRAP has been set and complete the pop instruction, which will result in the filling of the floating point accumulators and floating point status register with 18 bit words located in a particular portion of main memory, which is reversed for this floating point state. This operation will be completed regardless of the condition of the TRAP, and floating point accumulators, and all floating point states will be updated reflecting the pop floating point instructions. Operation of the FPU in accordance with a pop instruction is equivalent to doing four successive loads, which were discussed in detail previously under the condition or state number 1 dealing with the loading of floating point instructions.

State Number 5

State or condition number 5 is a store FPAC instruction, TRAP not set. The FPU will be busy processing previous instructions and the FPU instruction that is received will be a store FPAC. Upon issurance of the store FPAC instruction the CPU will monitor floating point busy condition and find that it is busy. Further processing of CPU instructions will be delayed until the floating point unit finishes the previous instruction. This monitoring takes place on the CPU/FPU interface control located in FIG. 2A. Upon completion of the previous instruction the store floating point instruction will be executed as follows.

The FPAC Mantissa will be loaded by way of Mantissa function bus 459, as earlier described being routed by way of working register input multiplexors 460 to 463 to the working register. The exponent and sign portion will be loaded into the exponent source working register located in block 439. Output of these registers is connected by exponent source bus 474b to MEMIN bus drivers 472 and 473, to MEMIN bus 320. These outputs are enabled at appropriate times controlled by signals received from the CPU/FPU interface control. These same busses also go to MEMOUT drivers, and if appropriate, the MEMOUT bus is activated by MEMOUT bus drivers located in block 473, FIG. 5. Signals presented to MEMIN bus 320 are written into memory; signal presented to MEMOUT bus 318 are received by the CPU. (In other words, signals derived by way of MEMIN bus driver 472 which are placed on MEMIN bus 320 will be conducted to main memory 311 of FIG. 1A; inputs to MEMOUT driver 473 are conducted by way of MEMOUT bus 318 shown in FIG. 1A stored in CPU 314.)

This communication between FPU and CPU in memory is that communication which permits the work done by the FPU to be utilized by other portions of the data processing system. Although it cannot be stated within certainty as to the ratio of internal FPU operations to this store FPAC instruction, suffice it to say that the store FPAC instruction is not the usual instruction executed by the FPU. This completes the present description of operation of FPU in accordance with state number 5.

One final function of interest which does not necessarily relate to normal manipulations performed by the FPU will now be discussed, and is the source and destination accumulators selection function. The area of interest in this discussion is in the lower portion of FIG. 3. Source and destination accumulators located in register 428 are supplied with IR bits 1-4 on bus 433. FPAC address selection logic selects between source and destination accumulators specified by a four bit field contained in the IR or a four bit field contained in microcode, or contained within control store ROMs 419. For purposes of illustration, referring back to the previously mentioned multiply case, selection logic in that multiply example will choose IR bits 1-4, placing them on the FPAC selection bus and directing the bits to pipeline register 401 and 405. These IR bits are directed to exponent/Mantissa source and destination address bus 440, FIG. 4, and directed into exponent and sign storage block 439. The response to these source and destination addresses will specify the FPACs of interest for the particular operation described. The FPAC Mantissa is contained in block 457, FIG. 5; the FPAC exponent and sign is located in block 439, FIG. 4. This completes the present description of operation of the FPU in accordance with the FPAC address selection condition.

FIGS. 11, 12 AND 13

Figure 11:
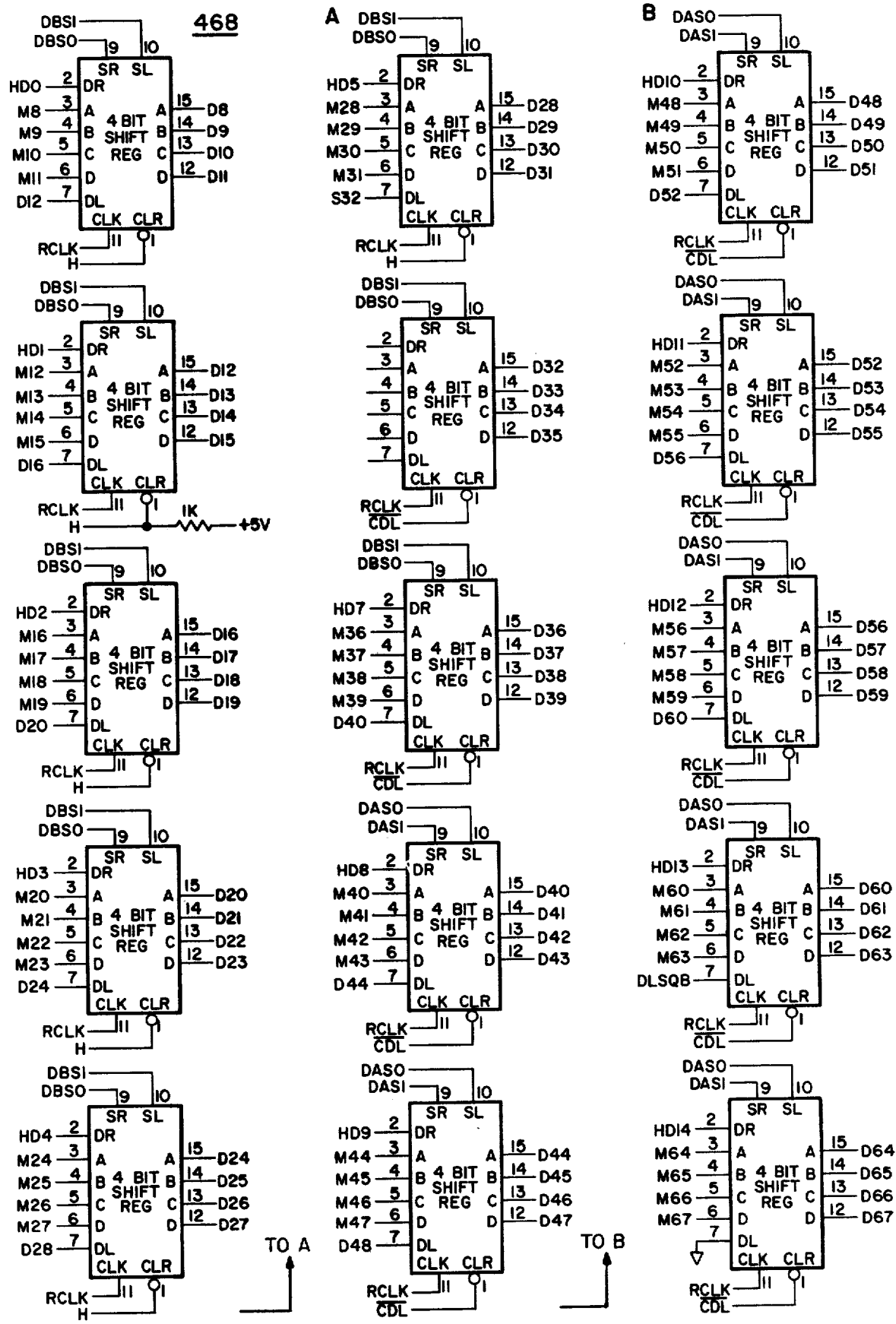
FIG. 11 is a schematic representation of the circuitry comprising working register 468.

Detailed schematic circuitry of the working register is shown in FIG. 11. As can be seen, standard shift register integrated circuits of a four-bit variety are employed. In FIG. 11, the layout of the shift registers is formatted in three columns of five rows. The shift register in the last row of the first column is intended to immediately precede the shift register of the first row of the second column, as indicated by dashed arrows "A"; and, similarly, the shift register in the last row of the second column is intended to immediately precede the shift register of the first row in the third column as indicated by dashed arrows "B". Signal inputs and outputs from the working register are as follows: Signals D8 through D67 represent the 60 outputs of the working register. The signals M8 through M67 represent the parallel loading inputs to the working register. RCLK is the working register clock, which runs at the frequency of FPU CLOCK (or FPUCLK) and in certain special cases runs at four times the frequency of FPU CLOCK. Other signals, HD0 to HD14, are hex digit zero to hex digit 14; these refer to the inputs of the shift right port of each working register, and are derived from the hex shifter logic. Next, signals DBS0 and DBS1 are used to control working register hex digits 0–7, and, signals DAS0 and DAS1 control working register hex digits 8 through 15. These signals are used to control the working register in modes shift left, shift right, parallel load, and hold. The signal CDL clears working register digits 6 through 14.

Figure 12:
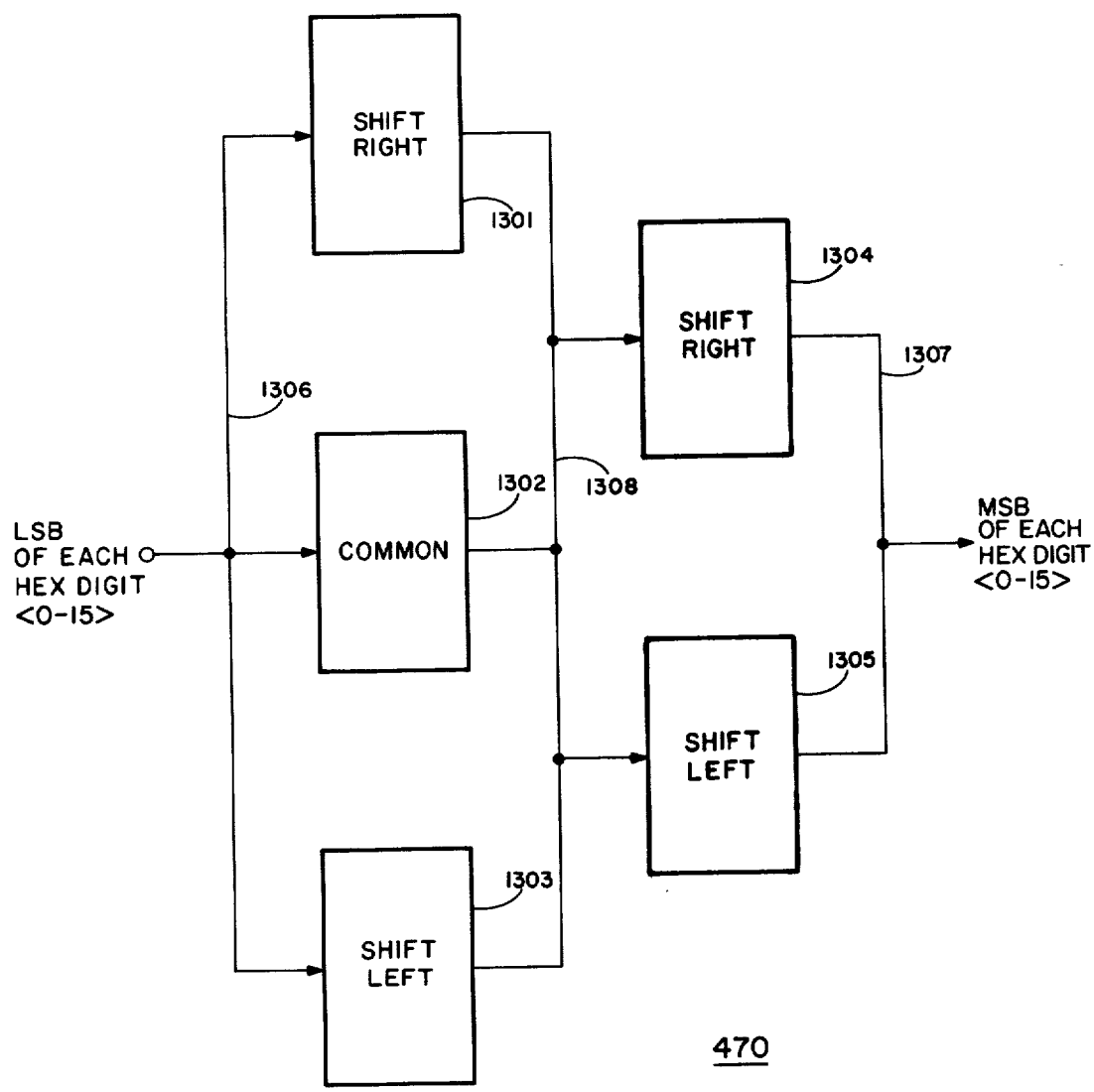
FIG. 12 is a block diagram of hex shifter 470.
Figure 13A:
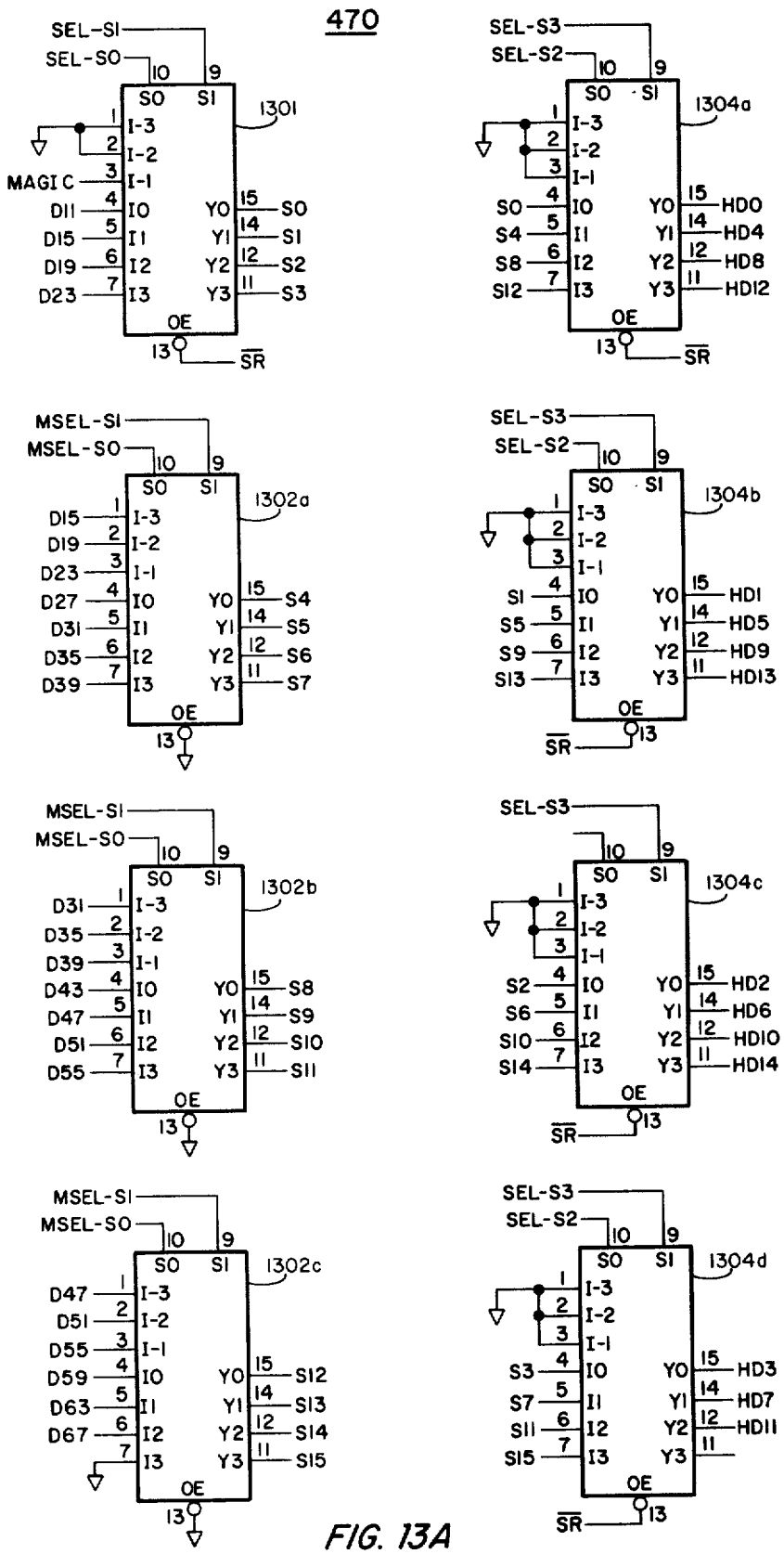
FIGS. 13A and 13B are schematic representations of the circuitry within hex shifter 470; and, FIGS. 14A and 14B are timing diagrams showing various clock and interfacing signals employed by the data processing system and the FPU contained therein.
Figure 13B:
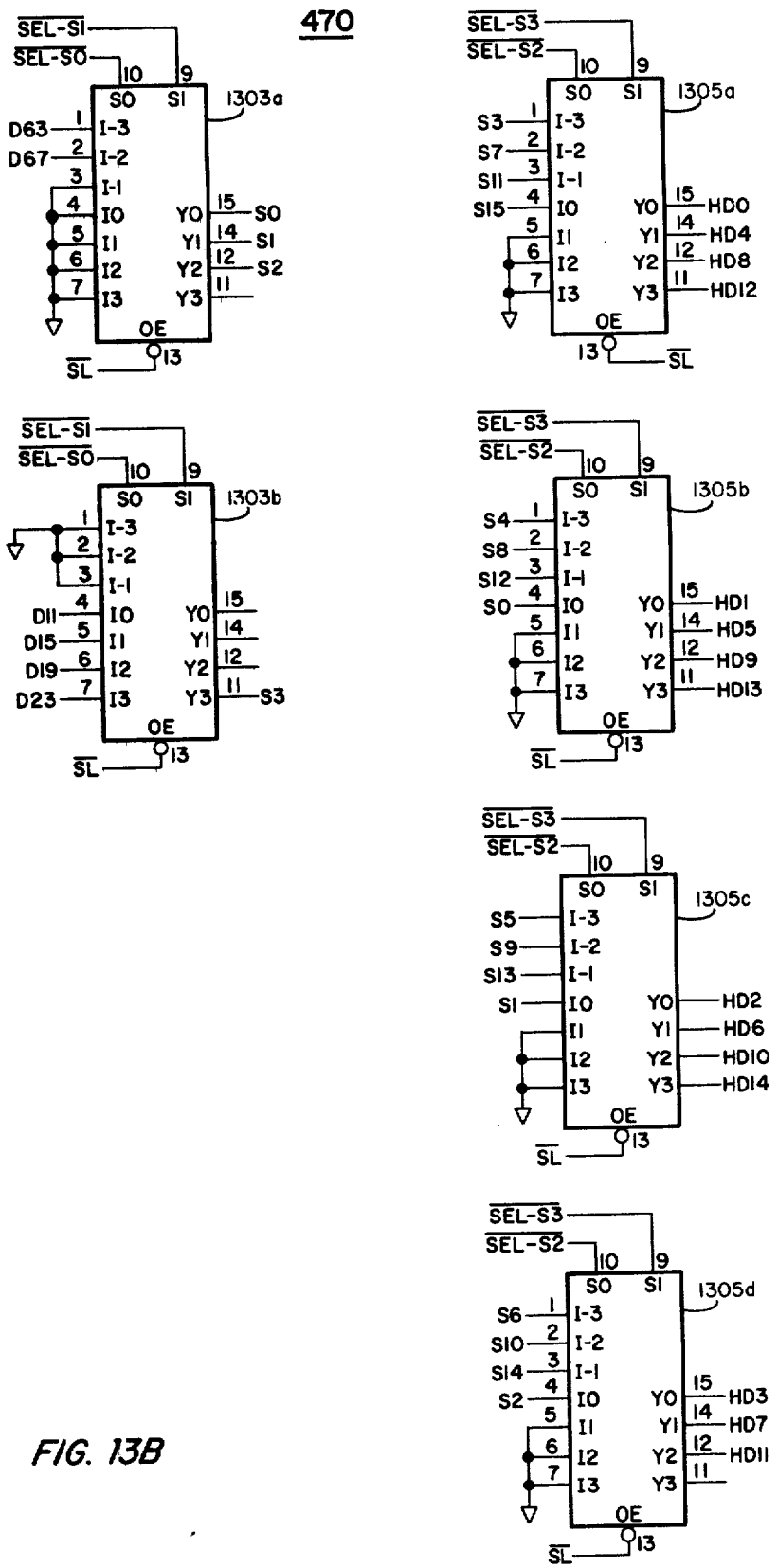

Next, referring to FIGS. 12A and 12B, and FIG. 13, the architecture and detailed circuitry of hex shifter 470 are shown. Again, the detailed circuitry is comprised of standard integrated circuit components commercially available on the open market. The signals associated with the circuitry are as follows. HD0 through HD14 are the hex digits in the Mantissa. Signals S0 through S3 are the scale code signals generated by the hex shifter code input bus 403; these signals direct the scaling function of the hex shifter. Signal SL enables shift left portion of the hex shifter; SR shift right enables the shift right portion of the hex shifter. MSELS0 and MSELS1 are multiplexor select signal S0 and multiplexor select signal S1; these are variable signals that have a common enable and are selected by either shift left or shift right. Signals D11, 15, 19, 23, 27, 31, 35, 39, 43, 47, 51, 55, 59, 63, and 67 are the most significant bit of each hex digit of the Mantissa.

Still with regard to FIGS. 11, 12A, 12B, and 13, the detailed operation of working register and hex shifter architecture is now presented.

Each component of working register 468 is a shift register, and each shift register as noted is identical one to the other. Inputs and outputs of these shift registers are as follows. Each shift register contains four bits of the floating point Mantissa. Each four bits make up a single hex digit and could be labelled hex digits 0–14. These hex digits can receive data from the appropriate four-bit microprocessor slice and can also receive appropriately scaled data through the right shift input port designated hex digit 0–15. Their functions are controlled by signals DAS0, DAS1, DBS0, and DBS1 and are respectively shift left, shift right, parallel load, and hold. The left shift input port is connected to the next lower order bit of the next lower order hex digit.

Next, in FIG. 12, there are five basic blocks in the hex shifter. There is a shift right function which is made up of blocks 1301, 1302, and 1304; the shift left portion of the shifter is made up of blocks 1302, 1303 and 1305. The appropriate shifting function enables either the shift left or shift right combination of logic and directs signals on input bus 1306 which contains the least significant bit of each hex digit to the appropriate hex shifters.

This hex shifter may be viewed as a 32 to one multiplexor which can direct outputs of each high-order hex digit to the shift right input port of each hex digit.

In FIGS. 12 and 13, block 1301 employs a single shifter; in component 1302, three shifters are used; in 1303 two shifters are used; in 1304 four shifters are used; and in component 1305, four more shifters are used, a total of 14 shifters in all. These shifters are produced by Advanced Micro Devices, commercially available and designated AM25S10. Each of these devices has the ability to shift four bits of data either 0, 1, 2, or 3 places. The inputs to this group of five component blocks are derived on bus 1306 from the least significant bits of each hex digit 0–15. This bus 1306 is essentially the same as hex shifter input bus 469 derived from working register 468. Output bus 1307 is essentially equivalent to hex shifter output bus 471 shown in FIG. 5.

Referring to block 1301, operation of this block is described in detail as follows. Each output of the block 1301 is functionally equivalent to a four input multiplexor with inputs connected such that the selection code designated as select S0 and S1 can generate one bit shifts of the input data word. These shifts can be either 0, 1, 2, or 3 places on words on any length. Word length in this particular case is 16 bits long. For example, if the signals SEL, S0, and SELS1 are both zeros, data on Y0 output would be input data D11 on I0. If the SELS1 and S0 were low and high respectively, input data on input I-1 would appear on output Y0. This input S0 was low and S1 was high, the output that would appear on the Y0 output would be the input on the I-2 input. Assuming the input select S0 and select S1 are low, output Y0, for example, would be the input contained on input I-1. If the select S0, S1 inputs are high/low respectively, the output on the Y0 port would be the input contained in the I-1 port. If the inputs select S0 and S1 are low/high respectively, output on the Y0 port would be input contained on the I-2 input port. If the inputs select S0 and S1 are both high, the output on the Y0 port will be the input contained on the I-3 input port.

Timing Diagram—FIG. 14

FIG. 14 shows timing waveforms associated with various signals earlier described in this application. The timing diagram is formatted into four input/output timing conditions or formats for showing how signals are conducted between the FPU memory, and between the FPU and CPU. Format A is characterized as Double Precision Read Cycle Timing From Memory to FPU. B is entitled Double Precision Write Cycle Timing From FPU To Memory. Format C is entitled Transfer From FPU to CPU. And, format D is entitled Transfer From CPU to FPU. This group of waveforms also includes F40 clock, F20 clock F10 clock, F10 and F20 clock, and PORT EN. This grouping of clock signals is intended to be associated with all four formats.

With regard to FORMAT A, the signals are FMEM CLK, FPMEM, MEMIN, MEMOUT, PAUSE, CLR PAUSE, and FPU CLK. The double precision read cycle timing from memory to FPU begins as follows. At the start of memory reference labelled time equalizers on the timing diagram, the CPU puts out on the MEMIN bus the address of first word to be read from memory. This is depicted as ADDRESS 1 on the MEMIN signal. In conjunction with this, the CPU also puts out FPMEM at the same time. This signal alerts the FPU that 400 nanoseconds later, data will be available on MEMOUT bus and the FPU should clock this data into its working register. The FPU CLK is paused (low) at T=100 into the cycle and is held low; FPU CLK is started by CLR PAUSE between 400 and 500 nanoseconds into the cycle. About 100 nanoseconds after CLR PAUSE arrives, FPU CLK will have a transistion from low to high. This occurs at T=500 nanoseconds into the memory reference cycle. At this time the first data word from memory will be clocked into the floating point's working register. These cycles are repeated with the second, third and fourth word coming at 700, 900, and 1100 nanoseconds respectively.

At T=200 into the cycle, the CPU puts out the address of the second word (ADDRESS 2) on the MEMIN bus. At T=400 into the cycle, the CPU puts out the third address (ADDRESS 3) on the MEMIN bus. At T=600, the CPU puts out the fourth address (ADDRESS 4) on the MEMIN bus. These four addresses correspond to four successive locations in memory from which the words are being read. Refer to FIG. 8 for a pictorial description of these words as they are loaded into the working register.

In other words, FPU CLK will rise 75 nanoseconds after PAUSE goes high between 400 and 500 nanoseconds into the cycle. In this particular case, FPU clock will now run at 200 nanosecond cycle time clocking in the respective data 200 nanoseconds after the first data is clocked in. Note that MEMCLK may be delayed or held low in 100 nanosecond increments by the signals MEMWAIT and MEMSORRY issued by the main memories (refer to FIG. 1B). As noted on the timing diagrams, VALID DATA 1-4 will appear 400 nanoseconds after the address is sent out on the MEMIN bus for each of the four data words that are loaded into the FPU from memory. Note that the data is clocked into the floating point unit's working register on the rising edge of FPU CLK. These occur at T=500, 700, 900, and 1100 nanoseconds respectively.

Next, in FORMAT B double precision write cycle timing of the memory reference cycle, CPU will supply the address that the data is to be written in on the MEMIN bus to the memory. Also at this time the CPU will issue FPMEM to the FPU. This signal alerts the FPU that 100 nanoseconds after receipt of FPMEM, the FPU is to drive the first word onto MEMIN bus to be written into the address supplied by the CPU. These cycles are repeated three more times such that all four 16-bit words of the floating point unit are written into consecutive locations in memory. Repeating the signal on MEMIN bus shown as VALID ADDR 1 is generated by the CPU and goes to memory. Signal indicated as VALID DATA 1 is generated by the FPU and is driven onto the MEMBUS at the appropriate time by the FPU but goes to the memory. In summary, the CPU supplies the address for data to be written into memory and the FPU supplies the data that is written into this memory location.

Referring to FORMAT C entitled Transfer From FPU to CPU, transfer of data from the FPU to CPU will be described as follows. The CPU will put out the signal FPCPU alerting the floating point processor to the fact that it is to supply data on the MEMOUT bus a certain number of memory cycles after receipt of this signal and MEMSTART. CPU will also put out the signal INHSEL (Inhibit Select) which will inhibit the memory from supplying data on the MEMOUT bus for this particular memory reference instruction. Upon receipt of VALID FPCPU the FPU will count memory cycle clock pulses and will supply data on the MEMOUT bus from T=400 to 500. This data is driven on the MEMOUT bus by the signal FP DRIVE B. The FPU CLK will be held in the low state until this data has been supplied to the CPU at which time FPU CLK will again begin to cycle. In other words, data is supplied, for example, from the working register. The data will be loaded into the working register and the FPU clock will be frozen until a receipt of VALID FPCPCU. Upon receipt of this signal, three MEM clocks are waited until this data that is in the working register is driven on to the MEMOUT bus at the time from T=400 to 500 nanoseconds into the memory reference cycle; and, the CPU latches this data at T=500 nanoseconds into the memory reference cycle.

Finally, referring to sequence FORMAT D, Transfer From CPU to FPU, the timing diagram which illustrates this transfer of data is described as follows. Data from the CPU is written to the FPU. The FPU clock will be frozen in its low state with the cycle prior to the beginning of the start of the memory reference instruction. CPU will send out the signal FPCPU to alert the FPU that data is about to arrive. This in conjunction with MEMSTART creates the signal VALID FPCPU, and 100 nanoseconds after receipt of this signal FPU clocks the data into its working register from the MEMIN bus as shown. In this particular case, the CPU issues INHSEL to the memory to prevent this data from being written to the memory.

It is to be understood that throughout the patent application that the veniculum or overbar shown on certain signals in the drawings have the usual inversion meaning; that is, signal A is the inverted A signal.

It should be appreciated from the description of the timing diagram and from the other description in this application that the CPU and FPU cooperate with main memory in a way that permits the FPU to appear "transparent", in the system operational sense of the term, to the CPU. The CPU provides signals to and receives signals from main memory on the MEMIN and MEMOUT busses; the FPU, also connected between MEMIN and MEMOUT busses communicates with memory and with the CPU in a manner that does not impact or inhibit CPU operation.

The invention may be embodied in yet other specific forms without departing from the spirit or essential characteristics thereof. Thus, the present embodiments are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An FPU for making floating point calculations within a data processing system including processing means for processing said data, memory means for storing said data and for storing instructions which are used in control of operation of said system, input bus for conducting said data and instructions from said processor means to said memory means, output bus for conducting said data and instructions from said memory means to said processor means, said processor means including instruction means arranged to store one of said instructions at a time for controlling and permitting derivation of control of said operation of said system, said FPU comprising:

control means including means for receiving state signals and responsive to both operation of said instruction means and to said state signals, for providing FPU control signals to control operation of said FPU;

mantissa means connected between said input bus and said output bus, including means for conducting certain of said data therebetween, means for receiving certain of said FPU control signals from said control means, means for providing the mantissa means contribution to said state signals to said control means, responsive to said certain of said FPU control signals for manipulating mantissa portions of said certain of said data in a first pre-determined manner; and exponent/sign means including means for receiving other certain of said FPU control signals from said controls means, means for providing the exponent/sign means contribution to said state signals to said control means, responsive to said other certain of said FPU control signals for manipulating other than said mantissa portions of said certain of said data received from said mantissa means in a second pre-determined manner concurrently with operation of said mantissa means;

whereby the concurrent operation of said exponent/sign means and said mantissa means under control of said control means provides said floating point calculations within said data processing system.

2. The FPU for making floating point calculations within a data processing system as recited in claim 1 and wherein said control means comprises:

microprogram control means including microprogram sequencer and address selector means for combining a first representation of said one of said instructions with both a second representation of said mantissa means contribution to said state signals and a third representation of said exponent/sign means contribution to said state signals, for generating one set of microprogrammed control signals corresponding to each operation of said microprogram sequencer and address selector means; and pipeline register means including means for establishing a current control position and a next successive control position, for (1) storing in said current control position the next most previously generated said one set of microprogrammed control signals as said FPU control signals, for (2) loading into said next successive control position said one set of microprogrammed control signals, and for (3) transferring said one set of microprogrammed control signals to said current control position upon the occurrence of the next most successive said operation of said microprogram sequencer and address selector means.

3. The FPU for making floating point calculations within a data processing system as recited in claim 2 and wherein said microprogram control means comprises:

control store ROM means including means for receiving an input address signal resulting from operation of said microprogram sequencer and address selector means, for providing a first predetermined group of said one set of microprogrammed control signals to said pipeline register means.

4. The FPU for making floating point calculations within a data processing system as recited in claim 3 and wherein said microprogram control means further comprises:

random state controller means including means for receiving both (1) a random state signal from said microprogram sequencer and address selection means and (2) a second predetermined group of said one set of microprogrammed control signals from said control store ROM means, for providing decoded random state control signals to at least said pipeline register means.

5. The FPU for making floating point calculations within a data processing system as recited in claim 4 and wherein said microprogram sequencer and address selector means further comprises:

address selection logic means including means for receiving both (1) a portion of said second representation of said mantissa means contribution and a portion of said third representation of said exponent means contribution to said state signals and (2) a third predetermined group of said one set of microprogrammed control signals, for controlling said microprogram sequencer and address selector means in selecting the next successive said input address signal.

6. The FPU for making floating point calculations within a data processing system as recited in claim 5 and wherein said microprogram sequencer and address selector means further comprises:

a microprogram sequencer responsive to the controlling operation of said address selection logic means for generating both (1) a first signal conducted to (a) said control store ROM means, conducted to (b) said random state controller means, and fed back to (c) said microprogram sequencer, and (2) a second signal.

7. The FPU for making floating point calculations within a data processing system as recited in claim 6 and wherein said microprogram sequencer and address selection means further comprises:

a microprogram selector responsive to (1) said second signal, (2) a different portion of said second representation of said mantissa means contribution and a different portion of said third representation of said exponent means contribution to said state signals, (3) said first representation of said one of said instructions, and (4) certain ones of said FPU control signals from said current control position in said pipeline register means, for generating a microprogram selector signal to be received by (a) said control store ROM means, (b) said random state controller means, and (c) said microprogram sequencer; and means for preventing the simultaneous generation of both said first signal and said microprogram selector signal.

8. A floating point unit for making floating point calculations within a data processing system, including a CPU for processing said data and a main memory for storing said data, said floating point unit comprising:

control means for providing control signals to control operation of said floating point unit;

mantissa means including means for providing mantissa state signals to said control means, responsive to certain said control signals for manipulating mantissa portions of said data in a first predetermined manner to produce a mantissa result;

exponent/sign means including means for providing exponent/sign state signals to said control means, responsive to other certain said control signals for manipulating other than said mantissa portions of said data in a second predetermined manner and concurrently with operation of said mantissa means to produce an exponent/sign result, and a MEMIN bus and MEMOUT bus for interconnecting said floating point unit, said CPU, and said memory with data paths.

9. The floating point unit for making floating point calculations within a data processing system of claim 8, said unit further comprising:

means for interfacing clock signals and instruction/timing signals derived from said CPU with said control means.

10. The floating point unit for making floating point calculations within a data processing system of claim 9, and wherein said instruction/timing and clock signals include instruction/timing signal FPMEM and clock signal MEMCLK, said floating point unit including:

means responsive to FPMEM and MEMCLK for generating timing signals to determine when certain of said data stored in said main memory should be received by said floating point unit from said main memory on said MEMOUT bus and for generating other timing signals to determine when said mantissa result and said exponent/sign result should be received by said main memory from said floating point unit on said MEMIN bus.

11. The floating point unit for making floating point calculations within a data processing system of claim 9 wherein said interconnecting means includes MEMIN bus and MEMOUT bus, and wherein said instruction/timing signals include FPCPU, MEMSTART and FPMEM, and said clock signal includes MEMCLK, said floating point unit including:

means responsive to FPMEM and MEMCLK for generating timing signals to determine when certain of said data stored in said main memory should be received by said floating point unit from said main memory on said MEMOUT bus and responsive to FPCPU, MEMSTART, and MEMCLK for generating other timing signals to to determine when said mantissa result and said exponent/sign result should be received by said CPU from said floating point unit on said MEMOUT bus.

12. The floating point unit for making floating point calculations within a data processing system of claim 9 wherein said interconnecting means includes MEMIN bus and MEMOUT bus, and wherein said instruction/timing and clock signals include instruction/timing signals FPCPU, MEMSTART, and FPMEM, and said clock signals include MEMCLK, said floating point unit including:

means responsive to FPCPU, MEMCLK, and MEMSTART for generating timing signals to determine when certain of said data stored in said CPU should be received by said floating point unit from said CPU on said MEMIN bus and responsive to FPMEM and MEMCLK for generating other timing signals to determine when said mantissa result and said exponent/sign result should be received by said main memory from said floating point unit on said MEMIN bus.

13. The floating point unit for making floating point calculations within a data processing system of claim 9 wherein said interconnecting means includes MEMIN bus and MEMOUT bus, and wherein said instruction/timing signals include FPCPU and MEMSTART, and said clock signal includes MEMCLK, said floating point unit including:

means responsive to FPCPU, MEMCLK, and MEMSTART for generating timing signals to determine when certain of said data stored in said CPU should be received by said floating point unit from said CPU on said MEMIN bus and for generating other timing signals to determine when said mantissa result and said exponent/sign result should be received by said CPU from said floating point unit on said MEMOUT bus.

14. The floating point unit for making floating point calculations within a data processing system of claims 10, 11, 12, or 13 and wherein said timing signals and said other timing signals include PAUSE, CLR PAUSE, T100, T200, T300, and EN1, and functions thereof.

15. The floating point unit for making floating point calculations within a data processing system of claim 9 and wherein said mantissa means comprises:

means for receiving said data from said data paths and for transmitting said mantissa result to said data paths;

working register means for temporarily storing said mantissa portions of said data;

microprocessor slice means for receiving said mantissa portions of said data from said working register means and for manipulating said mantissa portions into manipulated mantissa portions of said data;

multiplexor means for combining said manipulated mantissa portions of said data with said data from said receiving means into said working register means; and hex shifter means including other means for receiving said mantissa portions of said data from said working register means and for receiving a shift signal from said exponent/sign means, for rearranging said mantissa portions of said data in said working register means.

16. The floating point unit for making floating point calculations within a data processing system of claim 15 and wherein said mantissa portions of said data are grouped as a plurality of digits of predetermined bits per digit, said hex shifter means comprising means for replacing any one of said plurality of digits with any other of said plurality of digits.

17. The floating point unit for making floating point calculations within a data processing system of claim 15 and wherein said mantissa portions of said data are grouped as a plurality of hexadecimal digits of four bits per digit, said hex shifter means comprising means for replacing any one of said plurality of hexadecimal digits with any other of said plurality of hexadecimal digits.

18. The floating point unit for making floating point calculations within a data processing system of claim 17 and wherein said hex shifter means includes LSB means for receiving the least significant bit of said four bits per digit for any one of said plurality of digits from said working register means, and MSB means for conducting said least significant bit into the most significant bit position of any other of said plurality of digits.

19. The floating point unit for making floating point calculations within a data processing system of claim 18 and wherein said clock signals include FPUCLK and working register means clock RCLK, including means for increasing rates of operation of said LSB means and said MSB means by a factor of four by adjusting RCLK to run at four times the frequency of FPUCLK.

20. The floating point unit for making floating point calculations within a data processing system of claim 18 and wherein said clock signals include FPUCLK and working register means clock RCLK, including means for increasing rates of operation of said LSB means and said MSB means by increasing frequency of RCLK relative to FPUCLK.

* * * * *